(12) United States Patent
Shahriar et al.

(10) Patent No.: US 11,580,100 B2
(45) Date of Patent: Feb. 14, 2023

(54) SYSTEMS AND METHODS FOR ADVANCED QUERY GENERATION

(71) Applicant: Comcast Cable Communications, LLC, Philadelphia, PA (US)

(72) Inventors: Muneem Shahriar, Sunnyvale, CA (US); Hanwen Ye, Irvine, CA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 64 days.

(21) Appl. No.: 17/193,901

(22) Filed: Mar. 5, 2021

(65) Prior Publication Data

US 2022/0292085 A1 Sep. 15, 2022

(51) Int. Cl.
| | | |
|---|---|---|
| *G06F 7/00* | (2006.01) | |
| *G06F 16/242* | (2019.01) | |
| *G06N 5/04* | (2023.01) | |
| *G06N 20/00* | (2019.01) | |
| *G06F 16/2455* | (2019.01) | |

(52) U.S. Cl.
CPC ...... *G06F 16/243* (2019.01); *G06F 16/24564* (2019.01); *G06N 5/04* (2013.01); *G06N 20/00* (2019.01)

(58) Field of Classification Search
CPC ........ G06F 16/00; G06F 16/313; G06F 16/61; G06F 16/93; G06F 16/285; G06F 16/3329; G06F 16/90332; G06F 16/24564; G06F 16/243; G06F 40/30; G06F 40/35; G06F 40/242; G06F 40/279; G06N 20/00; G06N 5/04

See application file for complete search history.

(56) References Cited

U.S. PATENT DOCUMENTS

| | | | | |
|---|---|---|---|---|
| 10,460,215 | B2 * | 10/2019 | Herold | H04N 5/23219 |
| 11,182,432 | B2 * | 11/2021 | Shi | G06F 40/30 |
| 2009/0132495 | A1 * | 5/2009 | Futatsugi | G06F 16/21 |
| 2019/0163745 | A1 * | 5/2019 | Beller | G06F 40/30 |

* cited by examiner

*Primary Examiner* — Mohammad A Sana
(74) *Attorney, Agent, or Firm* — BakerHostetler

(57) ABSTRACT

Systems and methods for determining a query for a data store are described. A natural language text may be analyzed using heuristic processing and one or more machine learning models. Query parameters may be determined from the heuristic processing and machine learning and combined to form a query in a query language. In the heuristic processing, parsing rules may be used to remove conditional terms to generate a base question. The base question may be input to the one or more machine learning model to generate a base query which may be combined with query parameters related to the conditional terms.

20 Claims, 11 Drawing Sheets

SYSTEMS AND METHODS FOR ADVANCED QUERY GENERATION

BACKGROUND

Large amounts of data are collected and stored using scalable database systems. However, in order to gain insights and conduct data analysis on this stored data, the data must be retrieved using a database query in a query language, such as structured query language (SQL), to extract data from a database system. The use of query languages may make the data inaccessible to many non-technical users despite the relatively simple syntax of these languages as compared to other high-level programming languages such as C++ and Java. Conventional approaches are inflexible and may not be applicable to specific use cases. Thus, there is a need for more sophisticated methods and systems for querying data stores.

SUMMARY

Systems and methods are described herein for determining a database query from a natural language question. A user may provide a natural language question (e.g., a question text) to request information from a data store. The natural language question may comprise a question using grammar and words typical to the user. The natural language question may be received as a natural language text or as audio that is translated into the natural language text. A heuristic search (e.g., a search based on search rules, using information known about a data store) may be applied to the natural language question to identify terms, such as conditional terms and other keywords. A base question for retrieving the requested information from the data store may be determined based on the natural language question. The base question may be a simplified version of the natural language question. The base question may be determined by removing words, such as conditional terms, identified in the heuristic search.

The base question may be input into one or more machine learning models. Since the base question is a simplified version of the original question, the machine learning models may yield more accurate results, be more efficient, and otherwise improve upon traditional techniques. The one or more machine learning models may comprise a separate machine learning model for each type of query parameter, such as a different model for each different operator, condition, command, and/or the like of a query language. The one or more machine learning models may determine a base query comprising various query parameters identified from the base question. The base query may be further updated based on query parameters associated with the heuristic results (e.g., query parameters corresponding to the removed conditional terms). The resulting query may be sent to the database to process the original question from the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The following drawings show generally, by way of example, but not by way of limitation, various examples discussed in the present disclosure.

DETAILED DESCRIPTION OF ILLUSTRATIVE EMBODIMENTS

A data store, such as a database, typically stores specific information related to a specialized field. A user that wants to retrieve data in the specialized field may ask questions for very specific types of data from such a data store. A medical researcher may want to retrieve blood pressure data from patients within a certain age range or a sales person may want to determine the amount of sales for one or more products over the last year. In such cases, conventional algorithms (e.g., WikiSQL based algorithms) for translating natural language queries into database queries fail to fulfill the exclusive needs of those specialists. The disclosed techniques addresses this problem at least in part by using a supervised template-driven process that can be trained and validated for specialized scenarios. The disclosed approach may be generally referred to herein as Text2SQL, which may comprise a natural language to database query translation process that may be trained for specific use cases.

The disclosed techniques may comprise the use of templates. A template may comprise a sample question (e.g., in a natural language) associated with a corresponding database query (e.g., SQL queries). Templates may be determined and/or stored for frequently requested data searches. Based on the question templates, the disclosed techniques may adjust to an individual use case by learning the domain questions and filtering out those questions that are outside of its domain of knowledge. The table schema as well as the stored data types and values may be determined. Using the stored data information, the text of a question may be preprocessed by utilizing a heuristic search process to extract detectable conditions from the question and to reduce the question to a basic form. The basic form may be later input into multiple machine learning models configured to determine query language, such as query modifiers. The results of the heuristic search process may be combined with the results of the by multiple machine learning models to form a complete query.

Figure 1:
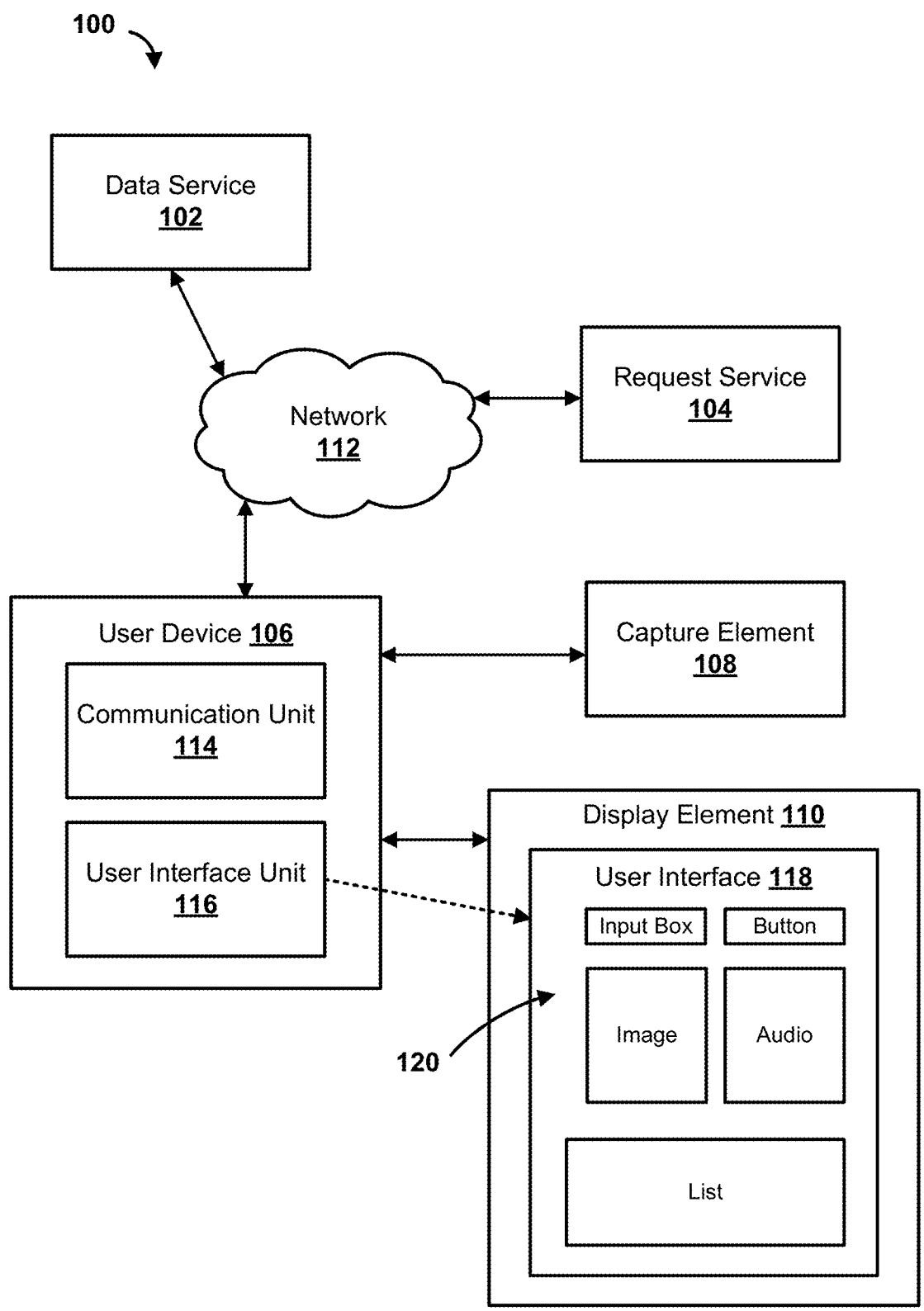
FIG. 1 shows a block diagram of an example system.

FIG. 1 is a block diagram showing an example system 100 for providing content. The system 100 may comprise a data service 102, a request service 104, a user device 106, a capture element 108, a display element 110, or a combination thereof. The data service 102, the request service 104, and/or the user device 106 may be communicatively coupled via a network 112 (e.g., a wide area network). The user device 106 may comprise the capture element 108 and/or the display element 110. In some scenarios, the capture element 108 and/or the display element 110 may be separate devices from the user device 106. The user device 106 may be communicatively coupled to the capture element 108 and/or display element 110 via the network, a wired connection, a cable, or another network (e.g., a local area network).

The network 112 may comprise a content distribution and/or access network. The network 112 may facilitate communication via one or more communication protocols. The network 112 may comprise fiber, cable, a combination thereof, and/or the like. The network 112 may comprise wired links, wireless links, a combination thereof, and/or the like. The network 112 may comprise routers, switches, nodes, gateways, servers, modems, and/or the like.

The data service 102 may be configured to store data associated with one or more services. The data may comprises sales data, service data, business data, user data, usage data, vendor data, employee data, infrastructure data, financial data, data associated with content (e.g., video, audio, images, text), a combination thereof and/or the like. The data service 102 may comprise one or more servers. The data service 102 may comprise one or more data stores, such as one or more databases. The data service 102 may be configured to allow access (e.g., via the network 112) to the data to one or more user devices, such as the user device 106. The data service 102 may be configured to retrieve the data based on one or more supported query languages, such as relational query languages, non-relational query languages, structured query language (SQL), presto, hive, cypher query language, MongoDB, and/or the like.

The user device 106 may be configured to receive the data from the data service 102. The user device 106 may comprise a computing device, smart device (e.g., smart glasses, smart watch, smart phone), a mobile device, a tablet, a computing station, a laptop, a digital streaming device, a set-top box, a streaming stick, a television, and/or the like.

The user device 106 may be configured to receive the content via a communication unit 114. The communication unit 114 may comprise a modem, network interface, and/or the like configured for communication via the network 112. The communication unit 114 may be configured to communicatively couple (e.g., via a local area network, a wireless network) the user device 106 to the capture element 108, the display element 110, a combination thereof, and/or the like.

The capture element 108 may be configured to capture user input. The user input may be detected and used to generate capture data (e.g., audio data). The capture data may be sent to the user device 106, the request service 104, or a combination thereof. The capture element 108 may comprise an audio capture element, such as a microphone. The capture element 108 may be comprised in a remote control, in the user device 106, in a smart device (e.g., smart glasses, smart watch), a speaker, a virtual assistant device, a combination thereof, and/or the like. The capture element 108 may generate the capture data based on detection of a trigger, such as a button press, recorded audio matching a phrase or keyword, a combination thereof, and/or the like.

The user device 106 may comprise a user interface unit 116. The user interface unit 116 may comprise an application, service, and/or the like, such as a content browser. The user interface unit 116 may be configured to cause display of a user interface 118. The dotted line in FIG. 1 indicates that the user interface unit 116 may cause rendering of the example user interface 118 on the display element 110. The user interface unit 116 may receive (e.g., via the network 112) user interface data from an application service (e.g., hosted on the network 112). The user interface data may be processed by the user interface unit 116 to cause display of the user interface 118. The user interface 118 may be displayed on the display element 110. The display element 110 may comprise a television, screen, monitor, projector, and/or the like.

The user interface 118 may be configured to allow the user to browse, navigate, access, and/or the like available data, such as data from the data service 102. The user interface 118 may comprise a plurality of interface elements 120. The plurality of interface elements 120 may allow for the data to the presented via the user interface 118. The plurality of interface elements 120 may be configured to present the data in a variety of forms, such as a text (e.g., in a list element, text element), a chart and/or graph (e.g., in an image element or other graphic module), audio data (e.g., audio playback element), a combination thereof, and/or the like. The plurality of interface elements 120 may comprise menu items for navigation of different views of the data. The plurality of interface elements 120 may comprise actionable interface elements, such as interface elements that may be clicked or otherwise interacted with to cause an action. An interface element may comprise an image, button, dropdown menu, slide bars, or any other kind of interactive element that may be used to select content.

The request service 104 may be configured to process requests associated with the data service 102. The request service 104 may process requests based on the techniques described herein, such as the methods of FIGS. 2-4, the processes shown in FIGS. 5-13, and/or the like. The request service 104 may be configured to receive data indicative of a natural language text. The request service 104 may receive the data indicative of the natural language text from the user device 106. A user may type in a request in natural language via an input box. A user may speak a request that may be detected by the capture element 108. The capture element 108 may generate capture data (e.g., audio data) indicative of the natural language text. The capture data and/or the data from the input box may be sent to the request service 104 as the data indicative of the natural language text. In some scenarios, the user device 106 may be configured to translate the capture data into text data comprising the natural language text. In other scenarios, the capture data may be translated by the request service 104.

The request service 104 may comprise a natural language processor. The natural language processor may decompose the capture data into discrete sounds. The natural language processor may use the discrete sounds to determine one or more words, phrases, and/or other audible identifiers in the audio data. Any number of the word recognition processes may be used by the natural language processor.

The request service 104 may be configured to determine, based on the data indicative of the natural language text, a request in a language associated with the data service 102. The request service 104 may be configured to determine the request by determining one or more clauses (e.g., or portions, modifiers) of the request. A clause may comprise an operator (e.g., or command). A clause may comprise a parameter, function, value, and/or the like associated with the operator. The request may be determined by appending multiple determined clauses in a manner consistent with the language used by the data service 102. A clause may define a location (e.g., table), one or more fields (e.g., or columns) of a data store, a condition (e.g., logic condition that determines if data is selected), grouping of results, ordering of results (e.g., ascending, descending), limiting of results (e.g., number of results to return), a combination thereof, and/or the like.

The request service 104 may determine the request based on parsing the data indicative of the natural language text. Parsing the data may comprise using keyword searching, heuristic analysis, rule-based searching, and/or the like. The keywords, rules, and/or the like may be based on values, schema, column names, and/or the like of a specific data store. One or more words following a detected keyword (e.g., such as a specific preposition) may be associated with a query parameter. A keyword may comprise a conditional term, such as a preposition, prepositional phrase, and/or the like. A keyword, such as "in", "during", "at", "of", and/or the like, may be associated with WHERE conditions. Keywords, such as "by", "per", "for each", may be associated with GROUP BY column conditions. As an illustration, a question, such as "Show me the top five students in the Computer Science course by region in year 2019?" may be parsed to identify keywords and associated values. The keyword "top" and its associated value "five" in "top five" may be used to identify a query parameter of "LIMIT 5". The keyword "by" and the keyword "region" (e.g., a keyword associated with a column) in "by region" may be used to identify a query parameter "GROUP BY region".

The request service 104 may be configured to determine a base question that may be simpler than the original data indicative of the natural language text. The base question may be determined by removing words associated with identified keywords, such as conditional terms (e.g., or a portion thereof). The original question "Show me the top five students in the Computer Science course by region in year 2019" may be simplified to "Show me the top students in course" by removing the words "five," "Computer Science," "by region," and "in the year 2019." These removed words correspond to conditional terms identified by parsing the data. Rules for removing terms may indicate which keywords like "by region" are removed and which keywords "top" are not removed (e.g., only the associated value is removed) in generating the base question. The rules for removing terms may be based on what types of information the models (e.g., machine learning models, described further herein) are trained to identify. It should be understood that the base question may be in a machine readable form (e.g., vectorized) that is different than the natural language text shown herein as examples.

Figure 6:
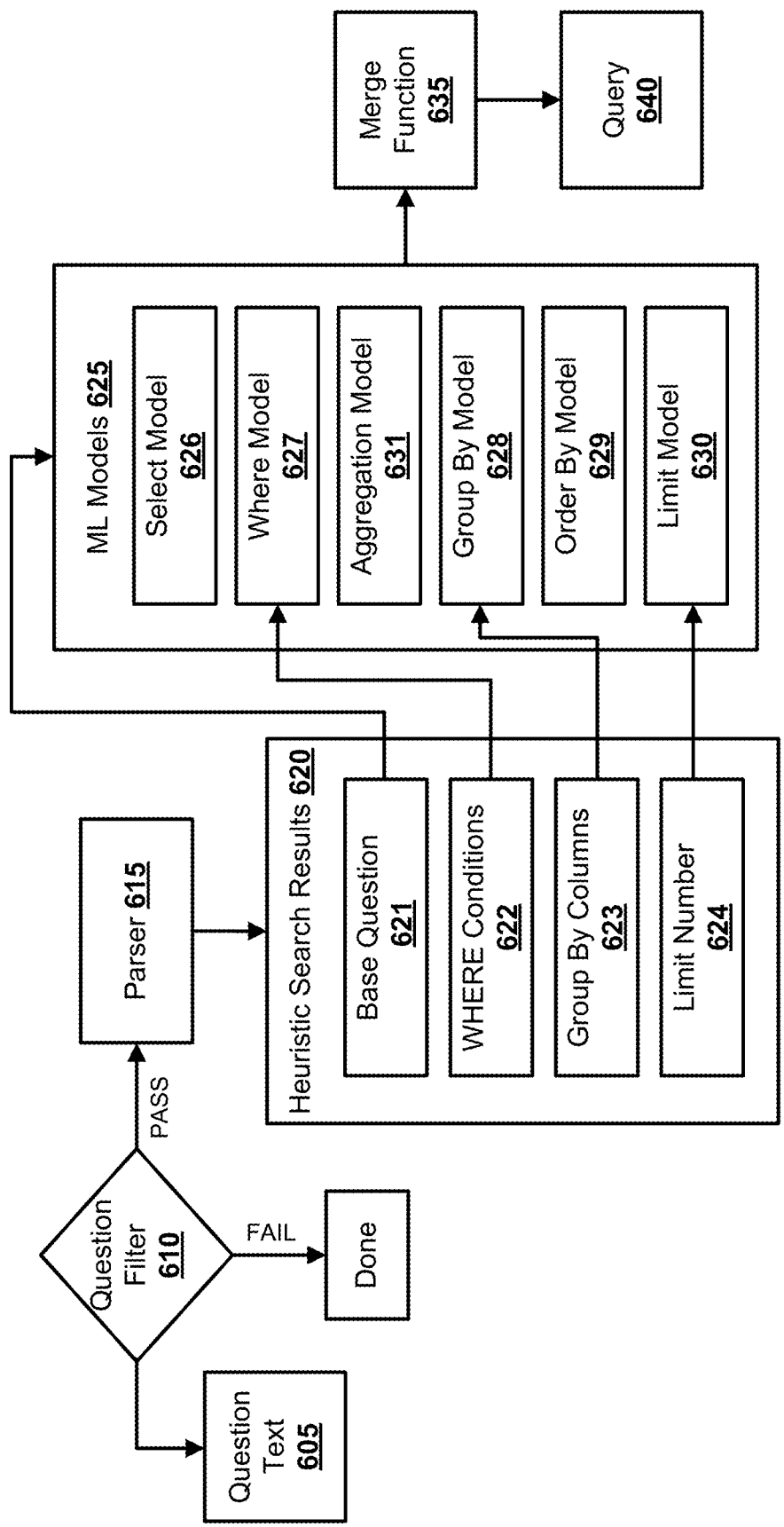
FIG. 6 shows a block diagram of an example process for determining a query.
Figure 9:
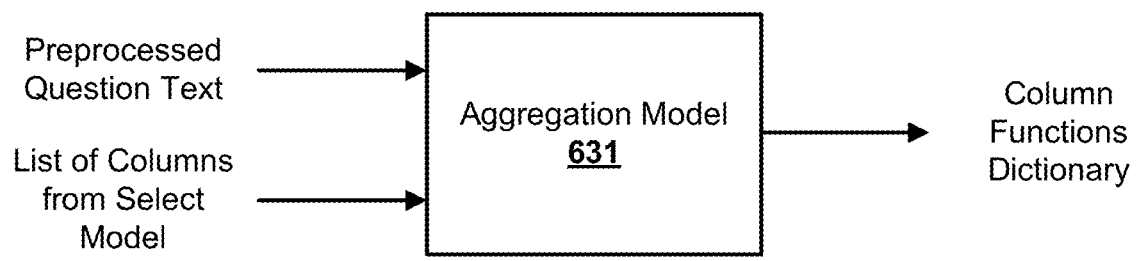
FIG. 9 shows a block diagram of an example aggregation model.

The request service 104 may determine the request based on inputting the base question (e.g., or some implementations the original data indicative of the natural language text) into one or more models (e.g., machine learning models). As explained further herein, at least one of the one or more models may also receive as input data associated with the removed conditional terms (e.g., as shown in FIG. 6, the Where model, Group By model, limit model). At least one of the one or more models may receive as input data output from another model of the one or more models (e.g., as shown in FIG. 9, output of the Select model used as input for Aggregation model). The one or more models may be trained based on a training data set derived from the data service 102, a data store of the data service 102, a combination thereof, and/or the like. The training data set may be determined based on adding data from the data store (e.g., or data service 102) to one or more templates associating natural language text with corresponding queries (e.g., query commands, operators, values) in the language of the data store.

The one or more models (e.g., each of the one or more models) may be associated with determining one or more of a specific type of query clause, a specific function of a query clause, a specific parameter of a query clause, a combination thereof, and/or the like. The one or more models may be configured to determine, for the request, one or more of: columns of the data store (e.g., a using a first model) to search, mathematical functions to apply to values of the data store (e.g., a using a second model), conditions to evaluate on the data store (e.g., a using a third model), columns to group results from the data store by (e.g., a using a fourth model), ordering of results for values in a column of the data store (e.g., a using a fifth model), or a limit of a number or results from the data store (e.g., a using sixth model). The one or more models may comprise one or more of a model for determining a select clause, a model for determining an aggregation function, a model for determining a where clause, a model for determining a group by clause, a model for determining an order by clause, or a model for determining a limit clause. At least one of the one or more models may be configured to output a result of the machine learning model to an input of another of the plurality of machine learning models. The one or more models may be configured to output a base query. The base query may comprise a combination of the results the one or more models. The base query may be in a query format associated with the data service 102.

The request service 104 may be configured to determine the request based on combining a result of the parsing and results from the one or more models. The result of the parsing may only be a partial result (e.g., lacking query parameters). Null values in the results from the one or more models may be supplemented with values from the parsing results. The parsing results may comprise parameters, conditions, operators, values, and/or the like that are not in the results from the one or more models. The parsing may comprise identifying conditional terms in the data indicative of the natural language text. The conditional terms may be translated to corresponding query parameters. The parsing results may comprise the conditional terms, query parameters corresponding to the conditional terms, and/or the like Combining the parsing results and one or more results from the one or more models may comprise performing a union of the parsing results and one or more results from the one or more models (e.g., combing all non-redundant data). If the parsing results and the results of the one or more models are conflicting, then the parsing results may be given priority over and/or used to replace conflicting results from the one or more models. The results may be combined by updating the base query with additional query parameters corresponding to the conditions terms identified in the parsing.

If not already in the appropriate format, the combined results (e.g., the combination of the parsing results and the results of the one or more models) may be converted to a query having the query format associated with the data service 102. The query format may be a format associated with a corresponding database language. The combined results may be formatted according to one or more rules, constraints, and/or the like associated with the databases language. The resulting query may be a valid query in the database language. To build a SQL query, the SELECT clause may occur first in the query. The SELECT clause may be followed by the results of the TABLE SELECTION clause. The results of the TABLE SELECTION clause may be followed the results of the WHERE conditions clause. If a LIMIT model has a result, then a LIMIT clause may appear after the WHERE clause (e.g., in My SQL, PostgreSQL, etc.). In some other SQL systems (e.g. Microsoft SQL server), the results of LIMIT may appear after the SELECT keyword but before the SELECT conditions.

The request service 104 may send the determined request to the data service 102. The data service may be configured to process the request to determine search results. The search results may be sent to the user device 106. The search results may be displayed on the display element 110. The search results may be displayed as one or more of the pluralities of interface elements 120. The search results may be displayed as a list of results, a chart, graph, and/or the like.

Figure 2:
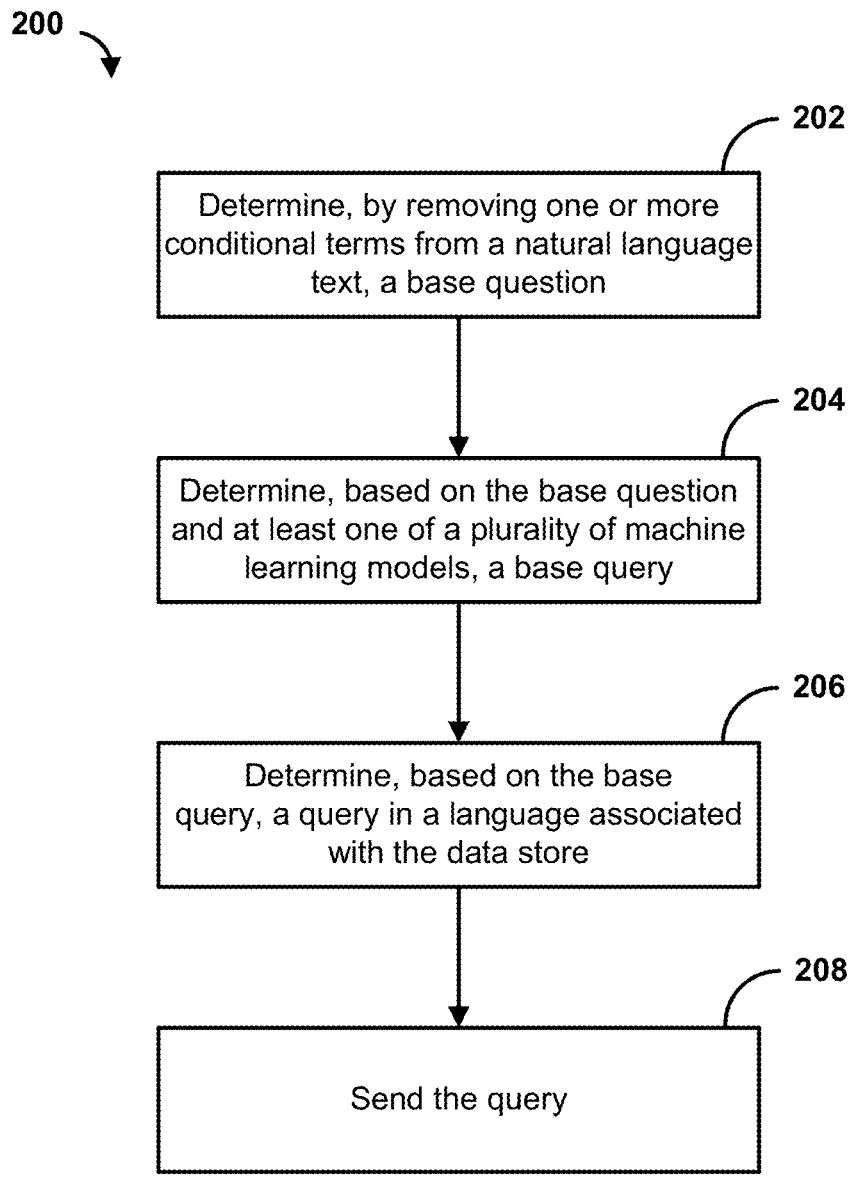
FIG. 2 shows a flowchart of an example method.

FIG. 2 is a flow chart showing an example method for processing a request. The method 200 may comprise a computer implemented method for providing a service (e.g., a data service). A system and/or computing environment, such as the system 100 of FIG. 1, or the computing environment of FIG. 14, may be configured to perform the method 200.

Data indicative of a request may be received. Audio data associated with the request may be received. A natural language text may be determined based on the audio data. The natural language text may comprise a conditioned data structure. The conditioned data structure may be determined by processing an original natural language text. The original natural language text may be the output of processing the audio data. The conditioned data structure may comprise data indicative of the original natural language text formatted for processing. The processing may be associated with one or more of the text parsing rules or the plurality of machine learning models. The conditioned data structure may be used in the determining one or more of a base question (e.g., shortened question, base question text, basic question, simplified question text), one or more first query modifiers, one or more second query modifiers, and/or the like as described further herein.

The conditioned data structure be determined by applying pre-processing techniques such as, but not limited to, stemming, lower-casing, removing stop words, replacing synonyms with one consistent word, and/or applying a Tf-idf vectorizer. The pre-processing may transform the original natural language text of the question to the conditioned data structure. The conditioned data structure may comprise a machine-readable version of the original natural language text. The conditioned data structure may comprise an array, a vector, a matrix, and/or the like. The conditioned data structure may be determined by applying a function that translates the original natural language text into a data form associated with a plurality of machine learning models. The data form may comprise numbers, arrays, vectors, matrices, text information, vector information, hierarchical information, and/or the like. The conditioned data structure may be a Tf-idf vectorized version of the question.

A determination may be made on whether the request may be outside or within a scope of the data store. The determination may be made based on a filter model and the natural language text (e.g., or conditioned data structure). The filter model may comprise a machine learning model trained based on a plurality of questions indicated as within the scope of the data store and a plurality of questions indicated as outside of the scope of the data store.

At step 202, a base question (e.g., basic question, basic question text, simplified question text, or a base query corresponding to the basic question) may be determined. The base question may comprise a more basic form of the original natural language text (e.g., or conditioned data structure). The base question may have one or more terms, such as one or more conditional terms, removed from the original natural language text. One or more first query parameters corresponding to the one or more conditional terms may be determined. The base question and/or one or more first query parameters may be determined based on identifying and/or removing conditional terms from the natural language question. The base question and/or the one or more first query parameters may be determined without the use of a machine learning model. The base question and/or the one or more first query parameters may be determined based on the natural language text (e.g., or conditioned data structure). The base question and/or the one or more first query parameters may be determined based on one or more text parsing rules (e.g., heuristics, heuristic search). The base question and/or the one or more first query parameters may be determined by applying the one or more text parsing rules to the natural language text (e.g., or conditioned data structure) associated with a request. The one or more text parsing rules may associate one or more words with corresponding types of query parameters. The one or more text parsing rules may determine the one or more conditional terms. The base question may comprise a remaining portion of the natural text language after removing conditional terms, words associated with the first set of query parameters, or a combination thereof.

The one or more of the base question and/or the first query parameters may be determined based on natural language text without applying machine learning to the natural language text (e.g., without inputting the natural language text into a machine learning model). The text parsing rules may be used instead of machine learning to determine one or more of the base question or the first query parameters. The text parsing rules may be based on real-time (e.g., or near real time) data, schema, and/or other information of the data store. The text parsing rules may be periodically updated (e.g., at the time of processing a request, or at scheduled intervals) based on the information of the data store. A parser may query the data store to determine updated information of the data store and use the information to generate updated text parsing rules. If a new column is added (e.g., or a column name is changed) to the data store, the name of the column may be used to identify matching synonyms (e.g., using a dictionary). The text parsing rules may be updated to cause replacement of the synonyms with the column name.

The base question and/or the first query parameters may be determined by removing one or more conditional terms from the natural language text. The text parsing rules may be configured to determine (e.g., or identify) the one or more conditional terms. The conditional terms may comprise terms (e.g., phrases, groups of words) corresponding to query conditions, such as terms corresponding to WHERE conditions, GROUP BY conditions, LIMIT conditions, and/or the like. A conditional term may comprise a preposition. A conditional term may comprise one or more words following and/or associated with the preposition. The terms "in", "during", "at", "of", and/or the like may identify WHERE conditions. The terms "by", "per", "for each", may identify GROUP BY column conditions. The terms "top" or "bottom" may identify LIMIT conditions.

An example question "show me the top five stores in the state of Pennsylvania" would have the terms "top five" and "in the state of Pennsylvania" identified as conditional terms. A corresponding base question could be generated by removing the terms "five" and "Pennsylvania." The keywords (e.g. prepositions) introducing the conditional terms may remain in the base question. The resulting base question may be "show me the top stores in state." The one or more first query parameters may comprise "WHERE= [state='Pennsylvania']" and "LIMIT|5|".

At step 204, a base query may be determined. The base query may comprise one or more second query parameters. The one or more second query parameters may be determined and used to form the base query. The one or more second query parameters may be determined based on at least one of a plurality of machine learning models associated with a data store. Each of the plurality of machine learning models may be associated with determining one or more of a specific type of query parameter, modifier, query clause, a specific function of a query clause, or a specific parameter of a query clause. Determining the base query may comprise causing the base question to be input to the one or more machine learning models, receiving the one or more second query parameters as output from the one or more machine learning models, determining the query by combining the one or more query parameters, or a combination thereof. The plurality of machine learning models may be configured to determine, for the request, one or more of: columns of the data store (e.g., a using a first model), mathematical functions to apply to values of the data store (e.g., a using a second model), conditions to evaluate on the data store (e.g., a using a third model), columns to group results from the data store by (e.g., a using a fourth model), ordering of results for values in a column of the data store (e.g., a using a fifth model), or a limit of a number or results from the data store (e.g., a using sixth model). The plurality of machine learning models may comprise one or more of a model for determining a select clause, a model for determining an aggregation function, a model for determining a where clause, a model for determining a group by clause, a model for determining an order by clause, or a model for determining a limit clause. At least one of the plurality of machine learning models may be configured to output a result of the machine learning model to an input of another of the plurality of machine learning models.

The plurality of machine learning models may be trained based on a training data set derived from the data store. The training data set may be determined based on adding data from the data store to one or more templates associating natural language text with corresponding queries in the language of the data store.

In the example question "show me the top five stores in the state of Pennsylvania" a base query generated based on this question may identify columns to select, such as "stores, revenue, state." The one or more machine learning models may identify that the question relates to "revenue" even though it is not specifically stated in the question. The base query may identify a table name, order by information (e.g., [revenue DESC]), and other details. Details related to the first query parameters (e.g., the conditional terms) may be omitted from the base query (e.g., but may be identified with placeholders, such as null values).

At step 206, a query in a language associated with the data store may be determined. The query may be determined based on the base query. The query may be determined based on data indicative of the one or more conditional terms. The base query may be updated to add query language corresponding to the one or more conditional terms. The first query parameters based on the one or more conditional terms may be combined with the second query parameters in the base query. The resulting query may comprise a combined set of query parameters. In the example, "show me the top five stores in the state of Pennsylvania" the resulting query may combine "WHERE=[state='Pennsylvania']" and "LIMIT|5|" from the first set of query parameters and "SELECT=[stores, revenue, state]," "ORDER BY=[revenue DESC]" and other information from the base query and/or second set of query parameters.

Determining the query and/or the combined set of query parameters may comprise one or more of: adding the one or more second query modifiers to the one or more first query parameters, prioritizing the one or more first query modifiers in resolving conflicts between the one or more first query parameters and the one or more second query parameters, or combining all non-redundant information into the combined set of query parameters.

At step 208, the query in the language associated with the data store may be sent (e.g., to a device configured to query the data store). The query in the language associated with the data store may be sent based on the combined set of query parameters. The language may comprise a structured query language for accessing the data store.

Figure 3:
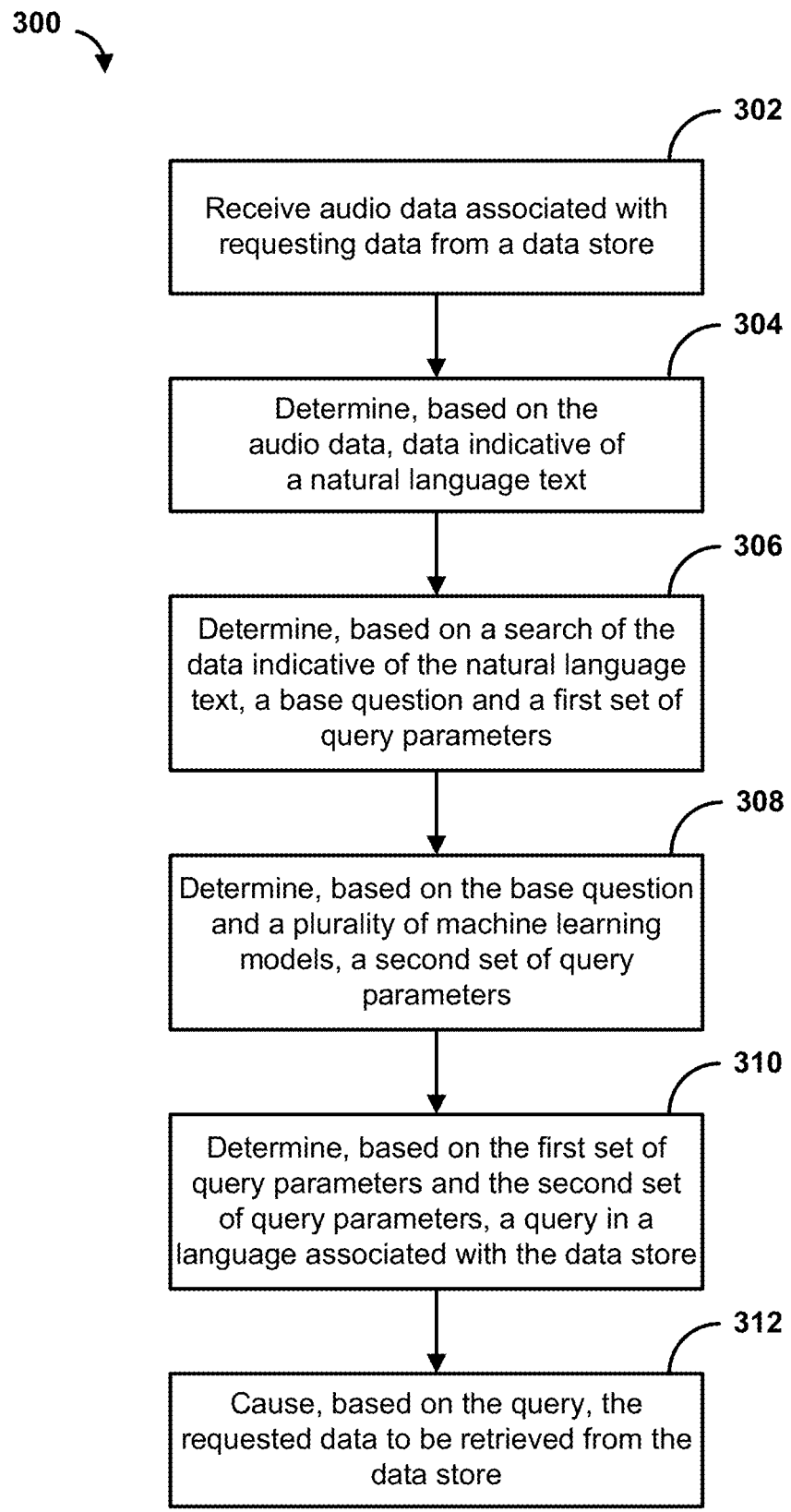
FIG. 3 shows a flowchart of an example method.

FIG. 3 is a flow chart showing an example method for processing a request. The method 300 may comprise a computer implemented method for providing a service (e.g., a data service). A system and/or computing environment, such as the system 100 of FIG. 1, or the computing environment of FIG. 14, may be configured to perform the method 300.

At step 302, audio data associated with requesting data from a data store may be received. The audio data may be captured by a microphone, such as a microphone integrated into a user device. The user device may comprise a computing device, a mobile device (e.g., a mobile phone, a laptop, a tablet), a smart device (e.g., smart glasses, a smart watch, a smart phone), a set top box, a television, a streaming device, a gateway device, digital video recorder, a vehicle media device (e.g., a dashboard console), a combination thereof, and/or the like.

At step 304, data indicative of a natural language text may be determined. The data indicative of a natural language text may be determined based on the audio data and using a natural language processor. The data indicative of the natural language text may comprise a conditioned data structure. The conditioned data structure may be determined by processing an original natural language text. The original natural language text may be the output of processing the audio data. The conditioned data structure may comprise data indicative of the original natural language text formatted for processing, such as processing associated with one or more of the text parsing rules or the plurality of machine learning models. The conditioned data structure may be used as input any of the steps below (e.g., as input to a first processing stage, a second processing stage, a plurality of machine learning models).

The conditioned data structure be determined by applying pre-processing techniques such as, but not limited to, stemming, lower-casing, removing stop words, replacing synonyms with one consistent word, and/or applying a Tf-idf vectorizer. The pre-processing may transform the original natural language text of the question to the conditioned data structure. The conditioned data structure may comprise a machine-readable version of the original natural language text. The conditioned data structure may comprise an array, a vector, a matrix, and/or the like. The conditioned data structure may be determined by applying a function that translates the original natural language text into a data form associated with a plurality of machine learning models. The data form may comprise numbers, arrays, vectors, matrices, text information, vector information, hierarchical information, and/or the like. The conditioned data structure may be a Tf-idf vectorized version of the question.

A determination may be made on whether the request is outside or within a scope of the data store. The determination may be made based on a filter model and the natural language text (e.g., or conditioned data structure). The filter model may comprise a machine learning model trained based on a plurality of questions indicated as within the scope of the data store and a plurality of questions indicated as outside of the scope of the data store.

At step 306, a base question may be determined. A first set of query parameters may be determined. The base question may comprise a remaining portion of the data indicative of the natural text language after removing words associated with the first set of query parameters. The words associated with the first set of query parameters may comprise conditional terms. The conditional terms may comprise terms (e.g., phrases, groups of words) corresponding to query conditions, such as terms corresponding to WHERE conditions, GROUP BY conditions, LIMIT conditions, and/or the like. A conditional term may comprise a preposition. A conditional term may comprise one or more words following and/or associated with the preposition. The terms "in", "during", "at", "of", and/or the like may identify WHERE conditions. Terms, such as "by", "per", "for each", may identify GROUP BY column conditions. Terms, such as "top" or "bottom" may identify LIMIT conditions.

An example question "show me the top ten oldest stores in the state of New Jersey" would have the terms "top ten" and "in the state of New Jersey" identified as conditional terms. A corresponding base question could be generated by removing the terms "10" and "New Jersey." The keywords (e.g. prepositions) introducing the conditional terms may remain in the base question. The resulting base question may be "show me the top oldest stores in state." The one or more first query parameters may comprise "WHERE= [state='New Jersey']" and "LIMIT|10|".

The base question and/or the first set of query parameters may be determined based on a first processing stage. The first processing stage may comprise a search of the data indicative of the natural language text. The first processing stage (e.g., determining the base question and/or first set of query parameters) may comprise applying, to the data indicative of the natural language text, one or more text parsing rules (e.g., heuristics, rules based on information about the data store) associating one or more words with corresponding types of query parameters. The first processing stage may not use machine learning to determine the first set of query parameters. Determining the first set of query parameters may comprise determining, without using machine learning to identify query parameters, the first set of query parameters.

The first processing stage (e.g., determining the base question and/or first set of query parameters) may be based on real-time (e.g., or near real time) data, schema, and/or other information of the data store. The first processing stage (e.g., text parsing rules of the first processing stage) may be periodically updated (e.g., at the time of processing a request, or at scheduled intervals) based on the information of the data store. The data store may be queried to determine updated information of the data store, which may be used to update the first processing stage (e.g., generate updated text parsing rules). If a new column is added (e.g., or a column name is changed) to the data store, the name of the column may be used to identify matching synonyms (e.g., using a dictionary). The first processing stage may be updated to cause replacement of the synonyms with the column name.

At step 308, a second set of query parameters may be determined. The second set of query parameters may be determined based on a second processing stage comprising a plurality of machine learning models. Each of the plurality of machine learning models may be associated with determining one or more of a specific type of query parameter, query modifier, query clause, a specific function of a query clause, or a specific query parameter of a query clause. The base question may be input into the plurality of machine learning models. The second set of query parameters may be output by the plurality of machine learning models. The second set of query parameters may be combined to form a base query. In some scenarios, the plurality of machine learning models may output the base query. In other scenarios, the base query may be formed based on the output of the plurality of machine learning models.

In the example question "show me the top ten oldest stores in the state of New Jersey," the base query may identify columns to select, such as "stores, opening_date, state." The one or more machine learning models may identify that the question relates to "opening_date" even though the term oldest is used instead of opening date. The base query may identify a table name, order by information (e.g., [opening_date ASC]), and other details. Details related to the first query parameters (e.g., the conditional terms) may be omitted from the base query (e.g., but may be identified with placeholders, such as null values).

The plurality of machine learning models may be configured to determine, for the request, one or more of: columns of the data store (e.g., a using a first model), mathematical functions to apply to values of the data store (e.g., a using a second model), conditions to evaluate on the data store (e.g., a using a third model), columns to group results from the data store by (e.g., a using a fourth model), ordering of results for values in a column of the data store (e.g., a using a fifth model), or a limit of a number or results from the data store (e.g., a using sixth model). The plurality of machine learning models may comprise one or more of a model for determining a select clause, a model for determining an aggregation function, a model for determining a where clause, a model for determining a group by clause, a model for determining an order by clause, or a model for determining a limit clause. At least one of the plurality of machine learning models may be configured to output a result of the machine learning model to an input of another of the plurality of machine learning models.

The plurality of machine learning models may be trained based on a training data set derived from the data store. The training data set may be determined based on adding data from the data store to one or more templates associating natural language text with corresponding queries in the language of the data store.

At step 310, a query in a language associated with the data store may be determined. The language may comprise a structured query language for accessing the data store. Determining the query may comprise translating at least one of the base question, the first set of query parameters, or the second set of query parameters to the language associated with the data store. The query in the language associated with the data store may be determined based on merging the first set of query parameters and the second set of query parameters. Determining the query in the language associated with the data store may comprise one or more of: adding the second set of query parameters to the first set of query parameters, prioritizing the first set of query parameters in resolving conflicts between the first set of query parameters and the second set of query parameters, or combining non-redundant information from the first set of query parameters and the second set of query parameters.

In the example, "show me the top ten oldest stores in the state of New Jersey" the resulting query may combine "WHERE=[state='New Jersey]" and "LIMIT|10|" from the first set of query parameters and "SELECT=[stores, opening_date, state]," "ORDER BY=[opening_date ASC]" and other information from the base query and/or second set of query parameters.

At step 312, the requested data may be caused to be retrieved from the data store. The requested data may be caused to be retrieved based on the query. The requested data may be sent to the user device. The requested data may be output via a user interface. The user interface may output the request data as a table, chart, graph, a combination thereof, and/or the like.

Figure 4:
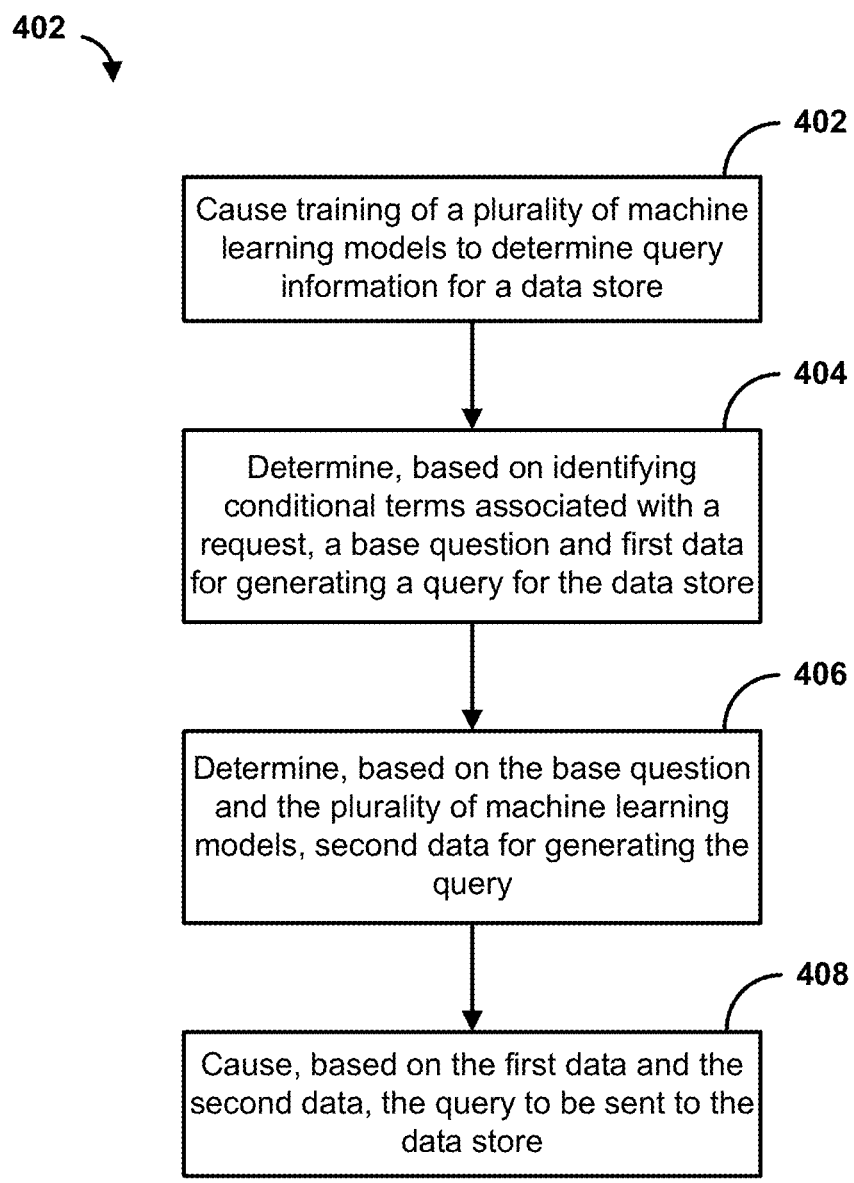
FIG. 4 shows a flowchart of an example method.

FIG. 4 is a flow chart showing an example method for processing a request. The method 400 may comprise a computer implemented method for providing a service (e.g., a data service). A system and/or computing environment, such as the system 100 of FIG. 1, or the computing environment of FIG. 14, may be configured to perform the method 400.

At step 402, training of a plurality of machine learning models may be caused. The plurality of machine learning models may be trained to determine query information for a data store. The training of the plurality of machine learning models to determine query information for a data store may be caused based on values in a data store. A training data set may be determined. The training data set may be determined by adding data from the data store to one or more templates associating natural language text with corresponding queries in a language of the data store. Causing the training may comprise causing, based on the training data set, the training of one or more of the plurality of machine learning models.

Each of the plurality of machine learning models may be associated with determining one or more of a specific type of query clause, a specific function of a query clause, or a specific parameter of a query clause. The plurality of machine learning models may be configured to determine, for the request, one or more of: columns of the data store (e.g., a using a first model), mathematical functions to apply to values of the data store (e.g., a using a second model), conditions to evaluate on the data store (e.g., a using a third model), columns to group results from the data store by (e.g., a using a fourth model), ordering of results for values in a column of the data store (e.g., a using a fifth model), or a limit of a number or results from the data store (e.g., a using sixth model). The plurality of machine learning models may comprise one or more of a model for determining a select clause, a model for determining an aggregation function, a model for determining a where clause, a model for determining a group by clause, a model for determining an order by clause, or a model for determining a limit clause. At least one of the plurality of machine learning models may be configured to output a result of the machine learning model to an input of another of the plurality of machine learning models.

Data indicative of a request may be received. Audio data associated with the request may be received. The audio data may be captured by a microphone, such as a microphone integrated into a user device. The user device may comprise a computing device, a mobile device (e.g., a mobile phone, a laptop, a tablet), a smart device (e.g., smart glasses, a smart watch, a smart phone), a set top box, a television, a streaming device, a gateway device, digital video recorder, a vehicle media device (e.g., a dashboard console), a combination thereof, and/or the like.

A natural language text may be determined based on the audio data. The natural language text may comprise a conditioned data structure. The conditioned data structure may be determined by processing an original natural language text. The original natural language text may be the output of processing the audio data. The conditioned data structure may comprise data indicative of the original natural language text formatted for processing. The processing may be associated with one or more of the text parsing rules or the plurality of machine learning models. The conditioned data structure may be used in the determining one or more of a base question, one or more first query parameters, or one or more second query parameters as described further herein.

The conditioned data structure be determined by applying pre-processing techniques such as, but not limited to, stemming, lower-casing, removing stop words, replacing synonyms with one consistent word, and/or applying a Tf-idf vectorizer. The pre-processing may transform the original natural language text of the question to the conditioned data structure. The conditioned data structure may comprise a machine-readable version of the original natural language text. The conditioned data structure may comprise an array, a vector, a matrix, and/or the like. The conditioned data structure may be determined by applying a function that translates the original natural language text into a data form associated with a plurality of machine learning models. The data form may comprise numbers, arrays, vectors, matrices, text information, vector information, hierarchical information, and/or the like. The conditioned data structure may be a Tf-idf vectorized version of the question.

A determination may be made on whether the request is outside or within a scope of the data store (e.g., or table or group of tables of the data store). The determination may be made based on a filter model and the natural language text (e.g., or conditioned data structure). The filter model may comprise a machine learning model trained based on a plurality of questions indicated as within the scope of the data store and a plurality of questions indicated as outside of the scope of the data store.

At step 404, a base question may be determined. First data for generating a query for the data store may be determined. The base question and/or first data for generating a query for the data store may be determined based on identifying conditional terms associated with data indicative of a request from a user. Determining the base question and/or first data may comprise determining, based on one or more text parsing rules (e.g., heuristics, rules based on information about the data store, such as columns, schema, values) associating one or more words with corresponding types of query parameters, the first data. The first data may comprise a first set of query parameters. A query parameter may comprise a clause, data value set, and/or the like indicating a command (e.g., operator) and any corresponding values, modifiers, and/or the like.

The base question may comprise a remaining portion of the data indicative of the natural text language (e.g., or the conditioned data structure) after removing words associated with the first set of query parameters. The words associated with the first set of query parameters may comprise the conditional terms. The conditional terms may comprise terms (e.g., phrases, groups of words) corresponding to query conditions, such as terms corresponding to WHERE conditions, GROUP BY conditions, LIMIT conditions, and/or the like. A conditional term may comprise a preposition.

A conditional term may comprise one or more words following and/or associated with the preposition. The terms "in", "during", "at", "of", and/or the like may identify WHERE conditions. The terms "by", "per", "for each", may identify GROUP BY column conditions. The terms "top" or "bottom" may identify LIMIT conditions.

An example question "show me the store in the state of Delaware with the lowest number of employees" would have the terms "the store" and "in the state of Delaware" be identified as conditional terms. A corresponding base question could be generated by removing the terms "the" in the store and "Delaware." The keywords (e.g. prepositions) introducing the conditional terms may remain in the base question. The resulting base question may be "show me stores in state with lowest number of employees." The first data may comprise "WHERE=[state='Delaware]" and "LIMIT=[1]".

The base question, conditional terms, and/or first data may be determined using text parsing rules based on real-time (e.g., or near real time) data, schema, and/or other information of the data store. The text parsing rules may be periodically updated (e.g., at the time of processing a request, or at scheduled intervals) based on the information of the data store. A parser may query the data store to determine updated information of the data store and use the information to generate updated text parsing rules. If a new column is added (e.g., or a column name is changed) to the data store, the name of the column may be used to identify matching synonyms (e.g., using a dictionary). The text parsing rules may be updated to cause replacement of the synonyms with the column name.

At step 406, second data for generating the query may be determined. The second data for generating the query may be determined based on the base question and the plurality of machine learning models. The base question may be input into one or more of the plurality of machine learning models. The one or more of the plurality of machine learning models may output the second data. The second data (e.g., a second set of query parameters) may comprise predictions for columns to select for the query, conditional clauses to limit which results are selected from data in the data store, grouping conditions for grouping results of the query, ordering conditions for ordering the results of the query, limit conditions for limiting results of the query. The second data may comprise data for generating the query that are not included in the first data. The second data may comprise data for generating the query that is redundant with the first data. The data for generating the query may comprise a base query. Conditions and/or query parameters (e.g., the second data) identified by the plurality of machine learning models may be combined in a query format to generate the base query.

In the example question "show me the store in the state of Delaware with the lowest number of employees," the base query may identify columns to select, such as "stores, employee_count, state." The base query may identify a table name, order by information (e.g., [employee_count ASC]), and other details. Details related to the first data (e.g., the conditional terms) may be omitted from the base query (e.g., but may be identified with placeholders, such as null values).

At step 408, the query may be caused to be sent to the data store. The query may be caused to be sent to the data store based on generating (e.g., or determining) the query using the first data and the second data. Generating the query may comprise translating at least one of the first data or the second data to the language associated with the data store. Generating the query may comprise one or more of: adding the second data to the first data, or prioritizing the first data in resolving conflicts between the first data and the second data. The base query may be supplemented with query parameters based on the first data, the second data, or a combination thereof. The language may comprise a structured query language for accessing the data store. A result of the query may be sent to a user device associated with the request.

In the example, "show me the store in the state of Delaware with the lowest number of employees," the resulting query may combine "WHERE=[state='Delaware']" and "LIMIT|1|" from the first data and "SELECT=[stores, employee_count, state]," "ORDER BY=[employee_count ASC]" and other information from the base query and/or second data.

Figure 5A:
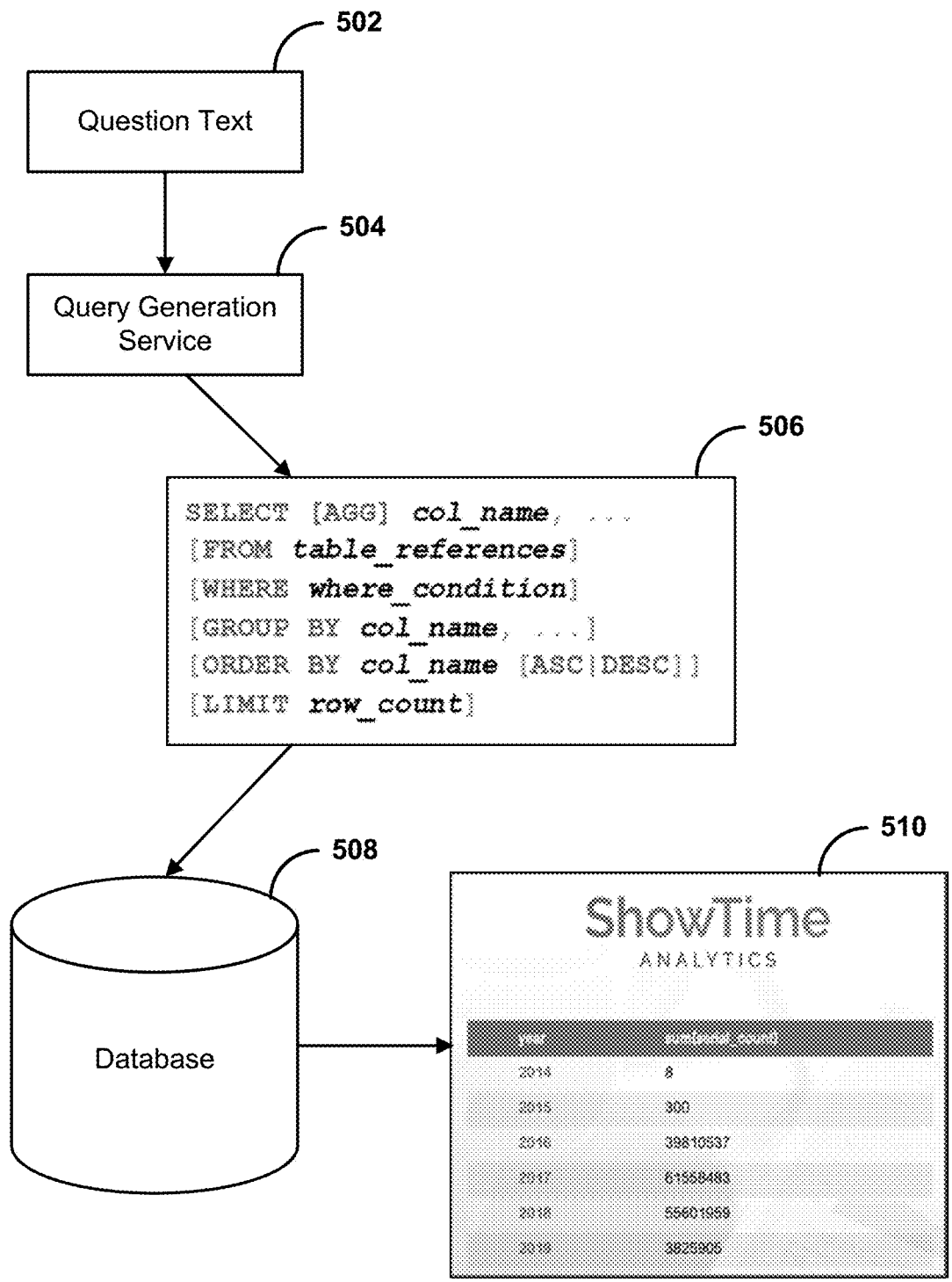
FIG. 5A shows a diagram of an example process for determining a query.

FIG. 5A shows a diagram of an example process for determining a query. At step 502, a question text may be received by a user device. The question text may be based on user input, such as audio input or text input. The question text may comprise a question in the form of a natural language text. As a non-limiting example and for purposes of illustration, the question text may comprise: "how many serials were sold per year?" The question text may be associated with a specific database.

At step 504, a query generation service (e.g., such as the request service 104 of FIG. 1) may determine, based on the question text, a query in a query language associated with the database. The query may be generated based on any of the techniques disclosed herein.

At step 506, an example query is output from the query generation service. The example query is shown in structured query language (SQL), but it should be understood that any other database language may be used. The disclosure is not limited to SQL, which is only used for purposes of illustration. The query may comprise a command (e.g., or operation), such as the SELECT command. The query may comprise one or more clauses associated with the command. The one or more clauses may comprise a clause indicating a table to apply the command (e.g., FROM clause), a clause indicating one or more conditions to evaluate for selecting data values (e.g., WHERE clause), a clause indicating grouping information for results (e.g., GROUG BY clause), a clause indicating ordering information for results (e.g., ORDER BY), a clause indicating a limit on the number of results (e.g., LIMIT clause), a combination thereof, and/or the like. One or more of the clauses may comprise conditions, names, values, or other parameters that further define the clause. The one or more clauses may comprise mathematical functions for aggregating results (e.g., AGG).

At step 508, the query may be sent to a database. The database may perform the query to determine search results. The search results may be sent to a user device, a service, a user interface, and/or the like. At step 510, the search results may be output via a user interface. The search results may be output as one or more rows. In some scenarios, the results may be output via a speaker, used to generate one or more charts, and/or the like.

Figure 5B:
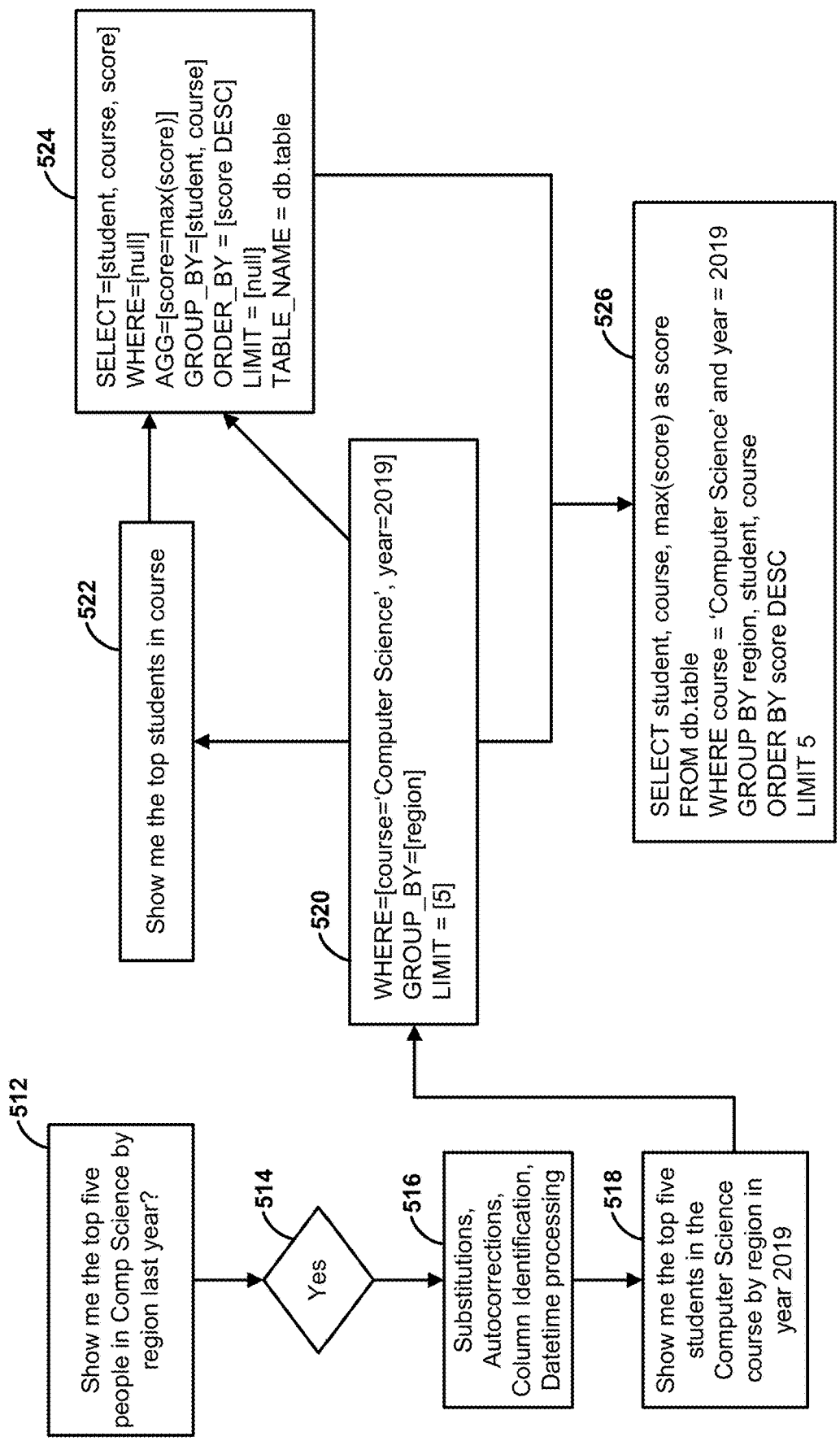
FIG. 5B shows a diagram of an example process for determining a query.

FIG. 5B shows a diagram of another example process for determining a query. At step 512, an example question text for a query may be received. The question text, as a non-limiting example, may comprise: "Show me the top five people in Comp Science by region last year." At step 514, a question filter may be applied to the question text. The question filter may indicate if the question passes the filter or not. The question filter may determine if the question is within the scope of any available databases. If the question text passes the question filter, the question text may be sent to a question pre-processor, at 516. The question pre-processor may apply one or more operations, such as substitutions, autocorrections, column identifications, datetime processing (e.g., identifying a current year, day, month associated with the query), and/or the like.

A substitution may comprise changing the word "people" from the question text to the word "students." Words may be substituted to match schema (e.g., column name) of the data store. The word students may be a column of a data store. People may be a synonym for students. The substitution may be performed based on performing a basic search for words associated with "people." Each of the words of the question text may be searched to perform a substitution for one or more of these words. The autocorrections, column identifications, and/or datetime processing may be based on a table schema, unique values of each column in the table, and/or the like. Abbreviated words may be replaced with the full version of the word. The words "Comp Science" from the question text may be autocorrected with the words "Computer Science." Column identification may comprise matching any of the words (e.g., or autocorrected/substituted words) to names of table columns. The datetime processing may determine relative time periods (e.g., next year, last year), current time periods (e.g., current year, current month, current day), complete dates based on incomplete dates (e.g., change Jul. 21 to Jul. 21, 2020). At 518, the resulting processed question text is shown.

At 520, the processed question text may be analyzed to determine heuristic results. The heuristic results may comprise a first set of query parameters, such as query parameters for a where clause, group by clause, and/or limit clause. The heuristic results may be determined based on parsing the processed question text using parsing rules. The term "Computer Science" in the question text may be determined to match a value of "Computer Science" for the column "course." The term "region" may be determined to match the column of "region" for the group_by clause. The terms "top five" may be determined to match a value of "5" for the limit clause.

At 522, a base question (e.g., or base question text, basic question, simplified question) may be determined based on the processed question text. The base question may be determined by removing words from the processed question text that match clauses identified using the parsing rules. The removed words may comprise conditional terms, terms associated with the conditional terms, terms following (e.g., next in order) the conditional terms, and/or the like. A conditional term may comprise a term associated with a condition, such as preposition. An example conditional term may comprise "in", "during", "at", "of", "by", "per", "for each", and/or the like. The removed words may comprise words that indicated particular values (e.g., values for a column). Words that match column names (e.g., not values associated with a specific column) may remain as part of the base question. The base question may comprise "Show me the top students in the course." The values removed from this base question may comprise "Computer Science," "region," and "five" (e.g., the values identified as heuristic results). Though shown as a text string, it should be understood that the base question may be stored as vector. The vector may be the set (e.g., list) of numbers determined based on an underlying embedding. The embedding may be based on the vocabulary of all the words applicable to the use-case. Generalized word embeddings (e.g. GLOVE embeddings) may also be used. Example vector embeddings of base questions may be used as input to train the individual machine learning models and used for the inference stage in which the same trained models are applied to analyze a base question in vector form.

At 524, the base question and/or the heuristic results may be input to one or more machine learning models. The one or more machine learning models may determine a second set of query parameters (e.g., based on the base question and/or heuristic results). The second set of query parameters may comprise values for a select operation, a where operation, a aggregation operation, a group_by operation, an order_by operation, a limit operation, and/or a table_name operation. A separate machine learning model may be configured to determine each of the first set of query parameters. The select operation may be determined to have values of "student, course, and score," indicating which columns to select values from. The where operator may be determined to have a null value. The aggregation operator may be determined to have a value of "score=max(score)" indicating that a highest value of scores is expected to be returned. The group_by operator may be determined to have a value of "student, course" indicating that the result should be grouped by the student and course columns. The order_by operator may be determined to have a value of "score DESC" indicating that results should be ordered from the highest to lowest scores. The limit operator may be determined to have a null value (e.g., no value). The table_name value may be determined to have a value of "db.table" indicating which table perform the search on.

At 526, the first set of query parameters may be combined with the second set of query parameters to determine a final search query. In combining the first set of query parameters and the second set of query parameters, the first set of query parameters may be given priority over the second set of query parameters. Any null values of the second query parameters may be replaced with any corresponding values from the first set of query parameters (e.g., and vice versa). The final search query may comprise "SELECT student, course, max(score) as score FROM db.table, WHERE course='Computer Science' and year=2019 GROUP BY region, student, course ORDER BY score DESC LIMIT 5."

FIG. 6 shows a diagram of data flow through components of a query conversion process 600 (e.g., NL2SQL engine). A natural language question, such as a written or spoken question can be received from a user. The natural language question may be processed (e.g., via pre-processing) to determine a preprocessed question text 605 of the natural language question. The preprocessed question text 605 may comprise a base question 621. As described in further detail herein, the base question may comprise a version of the natural language question in which one or more terms are removed, such as conditional terms. The base question may be a simpler form of the natural language question. The preprocessed question text 605 may be converted to a query 640 in a language used to generate data searches in a database storing a particular type of data. The query conversion process 600 may comprise a question filter 610, a parser 615, one or more machine learning models 625, a merge function 635, or a combination thereof.

Figure 7:
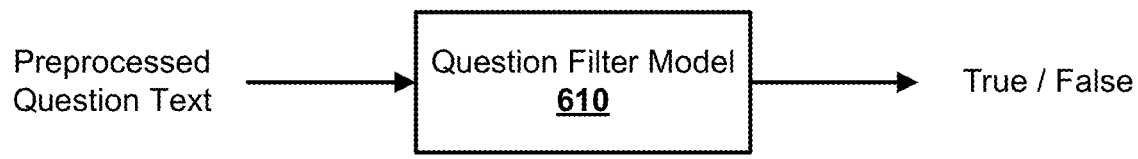
FIG. 7 shows a block diagram of an example domain filter model.

As shown in FIG. 7, the question filter 610 may receive the preprocessed question text. The question filter 610 may output, based on the input preprocessed question text, a logic value indicating a true or false. If the logic value indicates a true value, then the question is in the domain of the data in database. If the logical value indicates a false value, then the question is not in the domain of the data in the database. Determining whether the input question text is in the domain or not may be based on one or more of a probability model, a binary classification algorithm, a logistic regression, or a combination thereof. A logistic regression may be used that receives a tf-idf vectorized preprocessed question text as input and calculates the following probability:

$$P(X \text{ in question domain} | X) = \frac{e^{(\beta_0 + \beta X)}}{1 + e^{(\beta_0 + \beta X)}}$$

where X=Tf-idf vectorized question text (e.g., the preprocessed question text). If the question is determined not to be in the domain or false, the process may end.

All the questions associated with a particular use-case may be defined using question templates. If a question text does not match (e.g., have the same or similar meaning) one of the question templates for the corresponding use-case, then the question filter 610 may reject the question text. A rejected question text may be flagged as an invalid question. A sample list of false questions may be obtained from a question database (e.g., Wikipedia). Using a set of true and false questions (e.g., valid and invalid), a binary mode may be trained as a question filter. One major issue may be class imbalance (e.g., few true examples vs large number of false examples), which may be addressed by using an F1 score rather than accuracy.

If the question is determined to be within the domain (e.g., true value), the preprocessed question text may be sent to a parser 615, as shown in FIG. 6. The parser 615 may be configured to determine portions of the preprocessed question text that correspond to different expected constituent parts. A constituent part may be associated with a corresponding model, columns of the database, database schema, query clauses (e.g. or functions, arguments), and/or the like. The parser 615 may apply a parsing algorithm (e.g., search algorithm, heuristic search algorithm) to determine parsing results 620 indicating the constituent parts. The parser 615 may use search criteria, search rules, and/or the like to determine the corresponding parsing results. The parser may comprise a regex based parser. The parser 615 may search for keywords. The keywords may be part of a set of keywords determined based on questions used for training data.

Different regular expressions may be used to identify portions of the preprocessed question text that correspond to expected parts of a query. The expected parts of the query may be specific to a target database language. The parsing results 620 (e.g., or constituent part) may comprise results associated with a base question 621. The base question 621 may comprise a basic question with one or more conditions removed. The base question 621 may be determined by removing one or more conditions from the preprocessed question text (e.g., or the natural language question). The base question may be determined by removing words from the preprocessed question text that are determined to be associated with conditional modifiers by the parser 615. The base question may be used to determine a corresponding base query in the database language. The base query may comprise a database language version of the base question.

The parsing results 620 may comprise results associated with one or more conditional modifiers. The one or more conditional modifiers may be associated with the base query (e.g., to further define the base query). Conditional modifiers may comprise WHERE conditions 622, GROUP BY conditions 623, LIMIT NUMBER conditions 624, TABLE NAME conditions, HAVING CONDITIONS, a combination thereof, and/or the like. The HAVING condition may be applied on the aggregation columns of the fetched data set. An example HAVING CONDITION may comprise "HAVING=[max(score)>95]." The HAVING condition may occur at the end of a constructed query.

The parser 615 may be configured to determine the parsing results based on determining a plurality of n-grams. The preprocessed question text may be used to determine the plurality of n-grams. Each of the words in the preprocessed question text may be determined as a corresponding unigram (e.g., n-gram with one word). Combinations of words in the preprocessed question text may be used to determine bigrams (e.g., n-gram with two words), trigrams (e.g., n-gram with three words), and other n-grams (e.g., any arbitrary combination of words. The resulting plurality of n-grams may be matched to keywords associated (e.g., in a search rule) with corresponding part of the query, such as the base query, the conditional modifiers, and/or the like.

The parsing algorithm may iterate through each of the plurality of n-grams to determine whether the n-gram (e.g., or variant, corpus) is associated with (e.g., includes a word also detected in) the table schema, a column, a column value, a combination thereof, and/or the like. The determined column names and values may be categorized into their corresponding clause in a query in a desired database language based on the keywords, propositions, and/or the like from previous searches and/or training data. Words such as "in", "during", "at", "of" may be associated with WHERE conditions. Words such as "by", "per", "for each" may be associated with GROUP BY column conditions. One or more words following a detected keyword (e.g., such as a specific preposition) may be associated with the conditional modifier associated with the keyword. The search may obtain a list of WHERE clause conditions, GROUP BY columns and the LIMIT NUMBER if they exist.

The base question 621 (e.g., or base query), conditional modifiers, preprocessed question text version of the question, or a combination thereof may be applied to one or more machine learning models 625. The machine learning models 625 may be configured to determine fields in the query that may have not been determined in the heuristic search. The machine learning models 625 may include a machine learning model for each individual clause that is available in a language. Models for SQL clauses may comprise, a SELECT model 626, a WHERE model 627, an AGGREGATION model 631, a GROUP BY model 628, an ORDER BY model 629, a LIMIT model 630, or a combination thereof. The machine learning models 625 may also comprise a TABLE NAME model (not shown) configured figured to determine one or more table names to apply a query. The TABLE NAME model may determine the one or more table names based on the base question 621.

Figure 8:
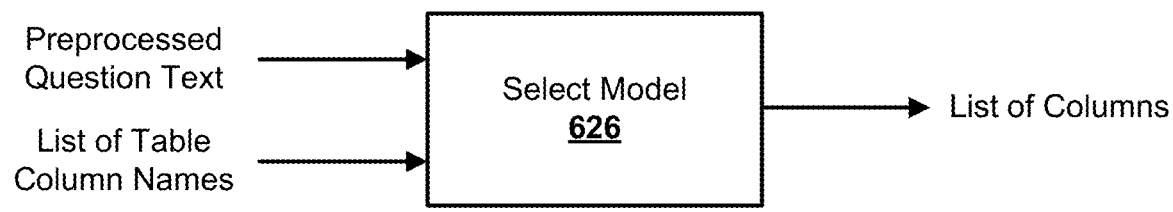
FIG. 8 shows a block diagram of an example select model.

The machine learning models 625 may comprise a SELECT model 626. The SELECT model 626 may comprise a model (e.g., machine learning model) configured to determine which columns in a database table are relevant to the request (e.g., are relevant to determining an answer to the request). The SELECT model 626 may be configured to predict a list of columns based on the preprocessed question text (e.g., or the base question). The columns may be the actual (e.g., physical) columns in the table. The columns may be one or more logical columns determined by applying one or more aggregation functions and/or pre-stored functions on one or more physical columns. As shown in FIG. 8, the SELECT model 626 may receive as input the preprocessed question text (e.g., or the base question). The input may comprise a list of the column names for the database. The SELECT model may output, based on the input, a list of column identifiers relevant to (e.g., associated with) the preprocessed question text (e.g., or the base question). The SELECT model 626 may be based on traditional machine learning (e.g., clustering, classification, linear regression, logistic regression, nearest neighbor, decision trees, naive Bayes classifier, support vector machine). The SELECT model 626 may be based on a Random Forest model. The SELECT model 626 may be based on machine translation using an encoder-decoder style sequence-to-sequence (Seq2Seq) neural network.

The Random Forest model for the SELECT model 626 may utilize a multi-label binarizer. The binarizer may be configured to transform a column list for the database into a fixed length of binary numbers, whose size equals the number of table columns (e.g., the number of physical columns and/or logical columns). Among the transformed binary numbers, '1' may represent a column that appears in the select field of a query. The number '0' may represent a column not in the select field. The Random Forest model may be trained using preprocessed question text (e.g., or base question) inputs along with the binarized column list for the database.

The Seq2Seq neural network for SELECT model 626 may append "<start>" and "<end>" flags to the preprocessed question text (e.g., or the base question) to account for variable length of a Seq2Seq search and end the prediction. The model may be trained by first applying a pre-trained Glove embedding layer to preprocessed question text (e.g., or base questions). A first multi-layered Long Short-Term Memory (LSTM) may then be utilized to encode an input sequence onto a fixed dimension space. At the same time, a second multi-layered LSTM may decode a shifted target sequence (e.g., after the "<start>" flag appended to the beginning of the preprocessed question text) from the encoder space. As a result, once a question text is provided to the encoder and the "<start>" flag is given to the decoder, the neural network may start predicting the SELECT columns in sequence.

The machine learning models 625 may comprise an AGGREGATION MODEL 631. In some implementations, the AGGREGATION model 631 may be omitted if the logical columns are represented directly in the list of columns used to train the SELECT model. The AGGREGATION model 631 may be configured to determine one or more aggregation functions (e.g., mathematical functions) to be applied to the selected columns. An aggregation function may comprise a count function (e.g., determines the number of elements in a set), average function (e.g., determines mean of a set of elements), maximum function (e.g., determines a highest value in a set of elements), median function (e.g., determines a median in a set of elements), minimum function (e.g., determines a lowest value in a set of elements), mode function (e.g., determines a mode of a set of elements), range function (e.g., determines a range of a set of elements), sum function (e.g., determines a sum of a set of elements), a combination thereof, and/or the like. The columns from select fields of a query may be the only fields that can be aggregated. The AGGREGATION model 631 may be based on the outputs from the SELECT model 626. As shown in FIG. 9, the AGGREGATION model 631 may receive the preprocessed question text (e.g., or the base question) as input. The list of columns determined in the SELECT model may be received as input. The AGGREGATION model 631 may output (e.g., based on the inputs) a column function dictionary.

Since multiple aggregation functions may be applied on one single column (e.g., minimum/maximum distance), each aggregated column may be mapped to a list of corresponding aggregation functions. As a result, the AGGREGATION model 631 may be configured to predict which selected columns will be aggregated. The AGGREGATION model 631 may also be configured to predict the aggregation functions to apply to the predicted columns. The AGGREGATION model 631 may be based on a simple model, a Col-Func Double model, a Func-Col Double model, a combination thereof, and/or the like.

A simple model used for the AGGREGATION model 631 may comprise a single Random Forest classifier. The simple model may iterate through the results from the SELECT model 626 and for each selected column. The simple model may predict an applied aggregation function list based on the preprocessed question text (e.g., or the base question) along with a selected column name. Consequently, the theoretical input size of such model may be $O(N*k)$ where N is the question size and k equals to the number of columns from the schema. The actual input size may be much smaller than the theoretical one because the selected columns may be a subset of the table columns. Regarding the target, since the number of existing aggregation functions is limited (e.g., similarly to the SELECT model 626), the AGGREGATION model 631 may change a target list into a binary vector using multi-label binarizer.

A Col-Func Double model used for the AGGREGATION model 631 may be based on a simple model with one additional Random Forest classifier. Based on a theoretical input size of a "simple model", as described above, the aggregated columns from the selected columns may be determined using another Random Forest classifier based on the preprocessed question text (e.g., or the base question) and SELECT model 626 results. A second classifier (e.g., similar to the "simple model"), may make an inference based upon the determined aggregated columns (e.g., instead of all selected columns). This additional step may reduce to $O(N)$ where N is the question size.

A Func-Col Double model used for the AGGREGATION model 631 may differ from the previous Col-Func Double model in the prediction order. Instead of obtaining the aggregated columns first, the Func-Col model may obtain the aggregation function list first. Similar to the previous architecture, the Func-Col Double model may comprise two random forest classifiers. The first one may use the preprocessed question text (e.g., or the base question) and all existing aggregation function names as inputs and determine which of those functions may be used for determining the query. Afterwards, the second classifier may use the preprocessed question text (e.g., or the base question) again, along with SELECT model 626 results and function name, for each function in the returned function list, to predict to which columns of the selected columns the function may be applied.

The machine learning models 625 may comprise a WHERE model 627. The WHERE model 627 may be configured to determine one or more "where" clause(s) for a database language, such as SQL. A where clause may indicate conditions to apply when selecting results of the query. Determining where clauses may be difficult due to the complicated condition dependencies that may be involved. Each where clause may be split into one or more conditions. Each condition may be further decomposed into (e.g., or may comprise) one or more column names, an operator, a value, or a combination thereof. The column name may indicate which column to apply the condition. The operator may comprise a comparison operator (e.g., equal to, contains, greater than, less than) to use to evaluate a value of the column. The value may comprise a value use for the comparison. A query comprising a where clause may have the form "WHERE column_name [operator] "value". A query that searches for values in column1 that equals the phrase channel1 may have the form "WHERE column"="channel1". Due to the parseable nature of a where clause, the where clauses may be determined based on sub-tasks using a neural network. The WHERE model 627 may be a machine learning model.

Figure 10:
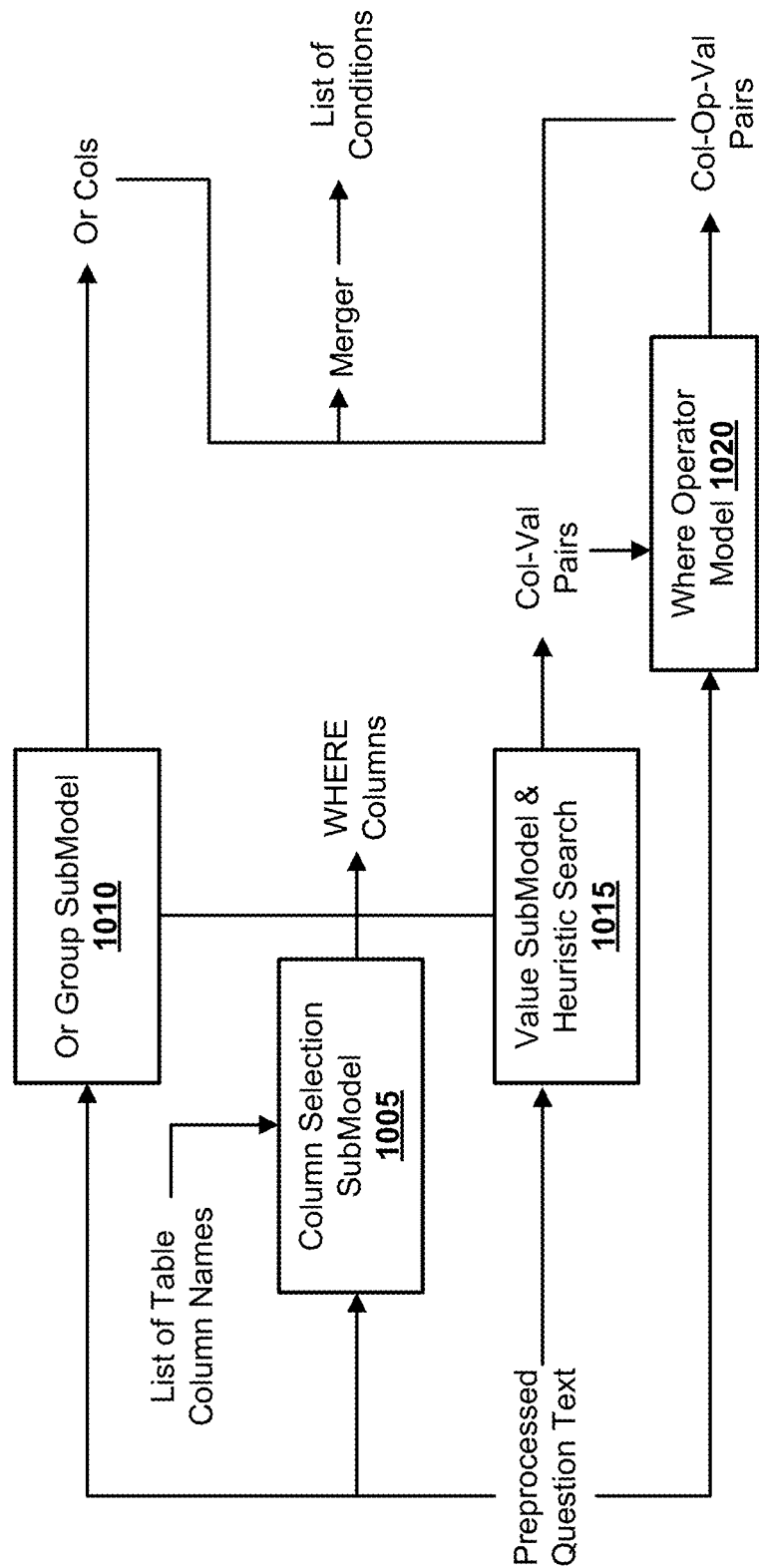
FIG. 10 shows a block diagram of an example where model.

FIG. 10 shows a flowchart for an example WHERE model 627. The WHERE model 627 may be configured to determine conditions for a query based on the preprocessed question text (e.g., or the base question). The WHERE model 627 may be configured to determine (e.g., for a specific condition) one or more of a column, a value, or an operator. The WHERE model 627 may comprise one or more sub-models associated with determining a corresponding column, value, and/or operator. The columns may be determined (e.g., predicted) by column selection sub-model 1005. The values may be determined (e.g., predicted) by the values sub-model and heuristic search 1015. The operators may be determined (e.g., predicted) by the operator sub-model 1020. The "OR" conditions may be determined (e.g., predicted) by the OR group sub-model 1010.

Column selection sub-model 1005 may determine one or more column names for a condition associated determining a where clause. The column selection sub-model 1005 may have the same architecture as the random forest model for select model 626 described above.

The value sub-model and heuristic search 1015 may be configured to map the columns found by the column selection sub-model 1005 to corresponding values (e.g., constraint value used in conjunction with an operator). Similar to the simple model of an AGGREGATION model 631 described above, value sub-model and heuristic search 1015 may receive the preprocessed question text (e.g., or the base question) and a column name (e.g., for each column in the results output by column selection sub-model 1005) as inputs. The value sub-model and heuristic search 1015 may determine (e.g., predict), based on the input, corresponding values of a condition for a where clause.

The Or group sub-model 1010 may be configured to determine columns grouped by the "or" operator from all found where columns. For purposes of illustration, consider the following where clause as a non-limiting example:

"WHERE A=1 AND (B=2 OR C=3 OR D=4)"

In this example, the columns grouped by the "or" operation are B, C, and D. The Or group sub-model 1010 may be trained on preprocessed question texts (e.g., or base questions). The Or group sub-model 1010 may comprise a random forest The Or group sub-model 1010 may be configured to output a list of grouped columns based on the preprocessed question text (e.g., or the base question).

The Where operator sub-model 1020 may be configured to determine one or more operators for conditions for a where clause. The Where operator sub-model 1020 may comprise a random forest model. The Where operator sub-model 1020 may be configured to receive as input the output of the value sub-model and heuristic search 1015. The output of the value sub-model and heuristic search 1015 may comprise a column, a value, an association of a column and a value (e.g., a column-value pair), and/or the like. The Where operator sub-model 1020 may be configured to receive as input the preprocessed question text (e.g., or the base question). The Where operator sub-model 1020 may be configured to output one or more of a column, a value, an operator, or a combination thereof. The output may comprise an operator, an association of the operator with one or more of a column or a value (e.g. a column, operator, value pair), a combination thereof, and/or the like.

The WHERE model 627 may be configured merge the output of one or more of the Or group sub-model 1010, the column selection sub-model 1005, the value sub-model and heuristic search 1015, or the Where operator sub-model 1020. The merged output may comprise one or more conditions formatted as one or more where clauses of a query. Each of the conditions may comprise a column, an operator, and a value.

The machine learning models 625 may comprise an ORDER BY model 629. The ORDER BY model 629 may be configured to determine one or more sorting parameters (e.g., to specify in a query). The sorting parameters may be used to determine an order by clause of the query. The order by clause may comprise one or more column names. The order by clause may comprise a function, such as an ascending order function (e.g., ASC) or a descending order function (e.g., DESC). The format for the order by clause may comprise, as non-limiting example, "ORDER BY column_name [function]." A query that indicates to order column1 by ascending order may comprise, as a non-limiting example, "ORDER BY column1 ASC."

Figure 12:
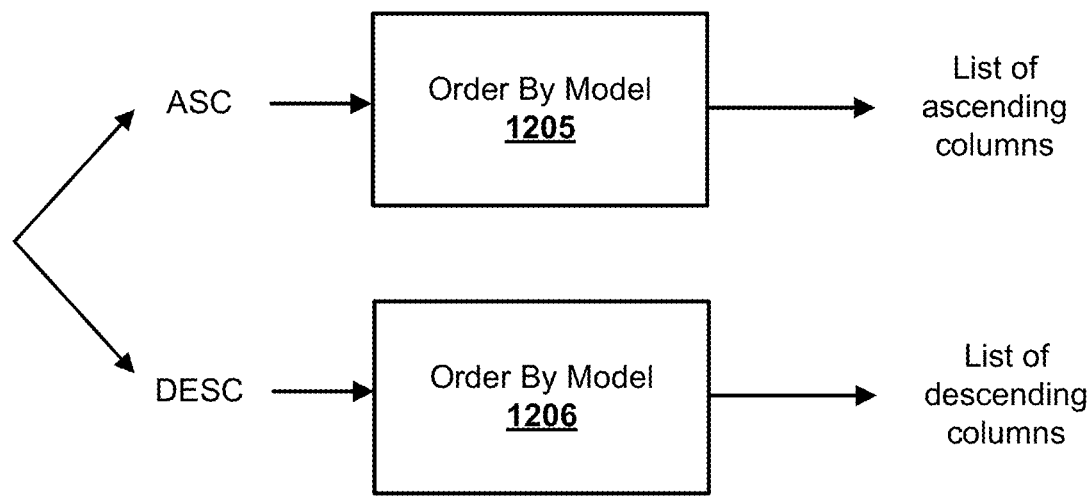
FIG. 12 shows a block diagram of an example order by model.

Similar to the AGGREGATION model 631, the ORDER BY model 629 may determine functions to apply to the table columns. As shown in FIG. 12, example functions may comprise ASC and DESC, which may each have corresponding models 1205 and 1206. The order by operator may be applied to any columns from the table schema. Different order functions may not be applied on the same column. Based on these properties and the properties of the AGGREGATION model 631, the ORDER BY model 629 may be provided by a function model, a column model, or a function-column model.

A function model used to provide the ORDER BY model 629 may be similar to the simple model that provides the AGGREGATION model 631. However, instead of making function predictions on each selected columns, the function model may iterate through every column from the entire table schema, which results into a $\Theta(N*k)$ input size, where N is the input question size and k equals to the number of table columns. The function model may convert the problem into a simple three-class classification task since there are only three cases for each column: ascending, descending, or neither.

A column model used to provide the ORDER BY model 629 may be a reversed version of the previous function model. Similar to the second classifier in the Func-Col Double model that may provide AGGREGATION model 631, this column model may predict the columns for ascending function as well as those for descending function by adding respective "<ASC>" or "<DESC>" flag to the preprocessed question text (e.g., or the base question).

A function-column model used to provide the ORDER BY model 629 may be similar to a function column model that provides the AGGREGATION model 631. Based on the assumption that order by is usually not common in a SQL query, the first classifier can be also treated as an order by existence checker so that prediction time can be saved to some extent.

Figure 11:
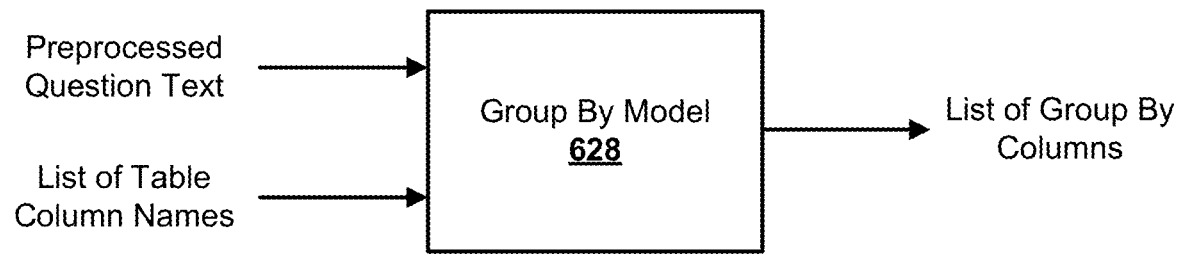
FIG. 11 shows a block diagram of an example group by model.

The machine learning models 625 may comprise a GROUP BY model 628. The GROUP BY model 628 may determine group by clauses in a query that arrange retrieved data into groups. Group by clauses may identify column name of the data by which to group query results. As shown in FIG. 11, the GROUP BY model 628 may receive as input the preprocessed question text (e.g., or the base question) and a list of the column names of the database. The GROUP BY model 628 may output (e.g., based on the input) one or more group by columns. The GROUP BY model 628 may be a Random Forest model. The GROUP BY model 628 may be similar to the Random Forest simple model described above for a SELECT model 626.

Figure 13:
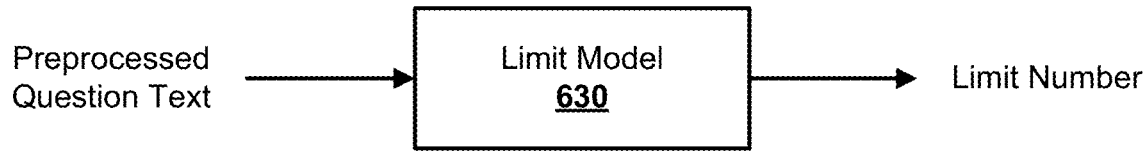
FIG. 13 shows a block diagram of an example limit model.

The machine learning models 625 may comprise a LIMIT model 630. The LIMIT model 630 may determine a single integer which defines the upper limit of the number of records returned by a query. As shown in FIG. 13, the LIMIT model 630 may receive a preprocessed question text (e.g., or the base question) as an input. The LIMIT model 630 may output, based on the input, a limit number. Since limit is numerical but not continuous, the limit may be determined based on a multi-class classification algorithm. The LIMIT model 630 may receive the preprocessed question text (e.g., or the base question) as input. The LIMIT model 630 may determine (e.g. predict), based on the input, a limit integer. The LIMIT model may comprise a random forest classifier, a logistic regression, a combination thereof, and/or the like.

The outputs of the machine learning models 625 may be provided to a merge function 635. Merge function 635 may combine the results from the parsing results 620 (heuristic search results) with the results from the machine learning models 625. The parsing results 620 may comprise the base question 621, the where conditions 622, the group by conditions 623, the limit number 624, or a combination thereof (e.g., determined using the parser 615). The results of the machine learning models 625 may comprise the results of the SELECT model 626, the results of the WHERE model 627, the results of the AGGREGATION MODEL 631, the results of the GROUP BY model 628, the results of the ORDER BY model 629, the results of the limit model 630, or a combination thereof. The output of the merge function 635 may comprise a complete query, such as query 640, in a database language, such as SQL. In cases where columns in where, group by, and limit integer conditions conflict between those two stages, the parsing results 620 may be chosen, in order to minimize the loss from machine learning algorithms. The merge function 635 for a given clause may additively combine the results obtained from the heuristic and machine learning approaches. The unique values from either the heuristic or the machine learning results may be selected as the results of the combination.

In some implementations, instead of using multiple machine learning models (e.g., one per SQL clause), one machine learning model may be used to predict the base query from the basic question. The base query may be parsed to indirectly obtain the machine learning results (e.g., without having to train nor run the individual ML models). The machine learning model results may be combined with the heuristic results to construct a full query in a query language associated with a data store.

The following illustrates an example implementation of the present disclosure. It should be understood that the disclosure is not limited to this specific implementation but the example is only given for purposes of illustration.

Supply chain data is important in many organizations. Supply chain data may include transactions which detail the movement and status changes of goods as the goods navigate throughout an organization's network. Analytical queries run on the supply chain dataset may be important for logistical, accounting as well as sales departments. As an experiment, the disclosed techniques (e.g., referred to in this example as an example "Text2SQL engine") were tested on sample supply chain data. The results show comparison to alternative models, validation of the usage of Heuristic-Search Algorithm, and demonstrate overall excellent performance of the disclosed techniques on this use case. It should be noted that any of the features of the example Text2SQL engine can be combined with any of the features described herein.

Data Preparation for the example Text2SQL engine is described as follows. The example Text2SQL engine was trained with question-query templates based on the use case. Several base questions (e.g., basic questions) which are frequently asked on the supply chain dataset were determined. By determining the common traits among the questions, question templates were determined as follows:

Count the number of <MOVE_TYPE> movements from <PREV_SITE)> to <CURR_SITE>?

Which <CURR_SITE> received the most <MOVE_TYPE> shipments?

What's the percentage of <MOVE_TYPE> shipments in 2019?

In a similar way, query templates were determined. Taking the first question template as an example, its corresponding query could be:

SELECT SUM(shipment)

FROM DB.TABLE WHERE

MOVE_TYPE=<MOVE_TYPE> AND

PREV_SITE=<PREV_SITE> AND

CURRENT_SITE=<CURRENT_SITE>

The table column name in the angle brackets may be replaced with the unique values of that column to construct the training dataset. In this experiment, 30 base question-query templates were built, which produced 395 question-query pairs in total. The question-query pairs may be expanded by appending conditions to the base questions. By appending additional conditions to the base questions, such as a region, a year, a quarter, the resulting training dataset included 349,647 data entries (×1000 enlargement).

During the model evaluation stage, all of the proposed models were tested on the basic and conditional question-query training dataset constructed from the data preparation stage above. The metrics were obtained by using grid-searched parameters after 5-fold cross validations.

An example question filter model was generated. The question filter model may be designed to distinguish domain and non-domain questions. For training, the domain questions come from the use case while the non-domain questions were obtained from the open-source WikiSQL dataset. As the question training sizes vary a lot between basic, conditional and WikiSQL questions, under-sampling techniques were applied. The performance metrics for this model are shown in Table 1 as follows:

TABLE 1

| Dataset | Accuracy | Precision | Recall | F1 Score |
|---------|----------|-----------|--------|----------|
| Basic   | 98.81    | 0.9989    | 0.9881 | 0.9931   |
| Cond    | 99.97    | 0.9997    | 0.9997 | 0.9997   |

From the listed metrics above, the question filter has slightly better performance when trained on the conditional question training set, due to its much larger input size. Overall, the high precision and recall scores indicates that the question filter is easily able to differentiate domain questions from non-domain ones.

Example SELECT models were generated. For SELECT model, two distinct architectures were used: machine learning based random forest classifier and encoder-decoder style Seq2Seq Neural Network. Similarly, those two architectures were evaluated and compared on the basic and conditional questions set.

Results of the Base Question Set are shown in Table 2 and results of the Conditional Question Set are shown in Table 3.

TABLE 2

| Model | Accuracy | Precision | Recall | F1 Score |
| --- | --- | --- | --- | --- |
| RF | 91.11 | 0.96475 | 0.97924 | 0.97070 |
| NNW | 50.0 | 0.53271 | 0.5777 | 0.54853 |

TABLE 3

| Model | Accuracy | Precision | Recall | F1 Score |
| --- | --- | --- | --- | --- |
| RF | 99.99 | 0.99999 | 0.99999 | 0.99999 |
| NNW | 98.86 | 0.99796 | 0.98886 | 0.99219 |

Based on the metrics shown above, the performance difference between random forest and neural network when trained on base questions was shown to be much larger than the one when trained on conditional questions. One plausible reason behind this is that a neural network is good at handling large dataset. For a small dataset with less than 400 data entries, using a deep neural network may result in over-fitting. Consequently, considering the possible small training dataset for a use case, the random forest approach was chosen for SELECT.

Example AGG models were generated. Three alternative models were proposed for AGG clause: "Simple Model", "Column-Function Double Model" and "Function-Column Double Model". Before evaluating these models, several metrics were customized for the AGG model because the model is expected to output a dictionary where columns were mapped to a list of functions, (e.g., making the usual metrics, such as recall, precision, f1 scores not suitable for this problem). Thus, the percentage of each wrong prediction case was used as complimentary metrics, such as: adding/missing an aggregated column as well as adding/missing a function for a column. Once the metrics were determined, AGG Model was evaluated on the two datasets and obtained the following shown in Table 4 (Base Question Set) and Table 5 (Conditional Question Set).

TABLE 4

| Model | Accuracy % | Add/Missing Col % | Add/Missing Func % |
| --- | --- | --- | --- |
| Simple | 71.05 | 22.7/63.6 | 0.0/0.0 |
| Col-Func | 86.84 | 10.0/100.0 | 0.0/0.0 |
| Func-Col | 86.84 | 40.0/100.0 | 0.0/0.0 |

TABLE 5

| Model | Accuracy | Add/Missing Col % | Add/Missing Func % |
| --- | --- | --- | --- |
| Simple | 100.0 | 0.0/0.0 | 0.0/0.0 |
| Col-Func | 99.992 | 75.0/100.0 | 0.0/0.0 |
| Func-Col | 99.997 | 66.67/100.0 | 0.0/0.0 |

Interesting results can be found from the metrics above. Both of the double-structured models have similar testing results to the "Simple model" on conditional questions but have much better performances on the base questions. For all of those incorrect predictions, both of the double-structured models missed at least one columns. Overall, considering the percentage of adding and missing columns and general performances on those two datasets, "Column-Function Double Model" will be chosen for AGG.

Example WHERE models were generated. The WHERE model may have the most number of dependencies among all other models. To test performance, WHERE sub-models were evaluated. The performance of heuristic search algorithm on WHERE clause was also demonstrated. Table 6 show results from the Base Question Set (without/with heuristic search). Table 7 show results from the Conditional Question Set (without/with heuristic search).

TABLE 6

| Model | Accuracy | Precision | Recall | F1 Score |
| --- | --- | --- | --- | --- |
| Column Sub-model | 98.89/98.89 | 0.9821/0.9821 | 0.9821/0.9821 | 0.9821/0.9821 |
| Value Sub-model | 100.0/100.0 | 1.0/1.0 | 1.0/1.0 | 1.0/1.0 |
| Operator Sub-model | 100.0/100.0 | 1.0/1.0 | 1.0/1.0 | 1.0/1.0 |
| OR Sub-model | 100.0/100.0 | 1.0/1.0 | 1.0/1.0 | 1.0/1.0 |
| Overall | 85.55/98.88 | 0.7679/0.9821 | 0.7818/1.0 | 0.7747/0.9909 |

TABLE 7

| Model | Accuracy | Precision | Recall | F1 Score |
| --- | --- | --- | --- | --- |
| Column Sub-model | 8.54/100.0 | 0.7576/1.0 | 0.4659/1.0 | 0.4311/1.0 |
| Value Sub-model | 0.01/100.0 | 0.8898/1.0 | 0.0001/1.0 | 0.0002/1.0 |
| Operator Sub-model | 50.09/100.0 | 0.7574/1.0 | 0.5009/1.0 | 0.3680/1.0 |
| OR Sub-model | 7.15e−03/100.0 | 7.15e−05/1.0 | 1/1.0 | 0.0001/1.0 |
| Overall Sub-model | 0.02/100.0 | 0.0601/1.0 | 0.9210/1.0 | 0.1128/1.0 |

As shown in the metrics above, there is a large model performance difference between whether heuristic search algorithm was used or not on the conditional dataset. On the other hand, applying heuristic search algorithm on the base questions does not have as significant an effect. This may be due to the fact that base questions do not have many additional conditions. As a result, if a question has external detectable conditions, applying heuristic search algorithm has proven its ability to boost the model accuracy up to a next level.

Example ORDER BY models were generated. Three different model architecture were tested. Similarly to the AGG model, the metrics were refined to be the percentages of adding/missing columns and missing functions ASC or DESC. Table 8 shows the obtained metrics for the Base Question Set. Table 9 shows the obtained metrics for the Conditional Question Set.

TABLE 8

| Model | Accuracy | Adding col % | Missing col % | Wrong Func % |
|---|---|---|---|---|
| Function | 52.63 | 58.333 | 0.0 | 41.667 |
| Column | 78.95 | 37.5 | 0.0 | 62.5 |
| Func-Col | 96.0 | 100 | 0.0 | 0.0 |

TABLE 9

| Model | Accuracy | Adding col % | Missing col % | Wrong Func % |
|---|---|---|---|---|
| Function | 100.0 | 0.0 | 0.0 | 0.0 |
| Column | 100.0 | 0.0 | 0.0 | 0.0 |
| Func-Col | 99.99 | 100 | 0.0 | 0.0 |

From the metrics above, the "Function-Column" model outperforms the other two models on the base questions compared to the conditional ones. Regarding the training time on the large conditional questions, the "Column" model took nearly 10 times as much time as the other two model would take.

Metrics were obtained for both GROUP BY and Limit models at the same time. Table 10 shows the obtained metrics for the GROUP BY and Limit models for the Base Question Set. Table 11 shows the obtained metrics for the GROUP BY and Limit models for the Conditional Question Set.

TABLE 10

| Model | Accuracy | Precision | Recall | F1 Score |
|---|---|---|---|---|
| GROUPBY | 95.55 | 0.9841 | 0.9758 | 0.9796 |
| LIMIT | 100.0 | 1.0 | 1.0 | 1.0 |

TABLE 11

| Model | Accuracy | Precision | Recall | F1 Score |
|---|---|---|---|---|
| GROUPBY | 100.0 | 1.0 | 1.0 | 1.0 |
| LIMIT | 100.0 | 1.0 | 1.0 | 1.0 |

Based on the scores shown above, both models had high quality prediction results on the basic and conditional questions.

Further comprehensive testing was performed. The experiment results for each individual model evaluated above allowed selection of the optimal model architecture as well as its corresponding parameter set. Based on this parameter set, all of the models, which were previously trained on base questions, were retained on the entire dataset due to its limited size. A final comprehensive testing was performed to examine whether the engine could eventually produce a correct SQL query. Results of the comprehensive testing are shown in Table 12.

TABLE 12

| Model | Basic | Conditional |
|---|---|---|
| SELECT | 99.24 | 99.99 |
| AGG | 100.0 | 100.0 |
| WHERE | 100.0 | 100.0 |
| ORDER BY | 100.0 | 100.0 |
| GROUPBY | 100.0 | 100.0 |
| LIMIT | 100.0 | 100.0 |
| OVERALL | 99.24 | 99.99 |

Based on the results above, using heuristic search algorithm and machine learning approach, the example Text2SQL engine is able to produce a correct SQL query at 99% accuracy.

Figure 14:
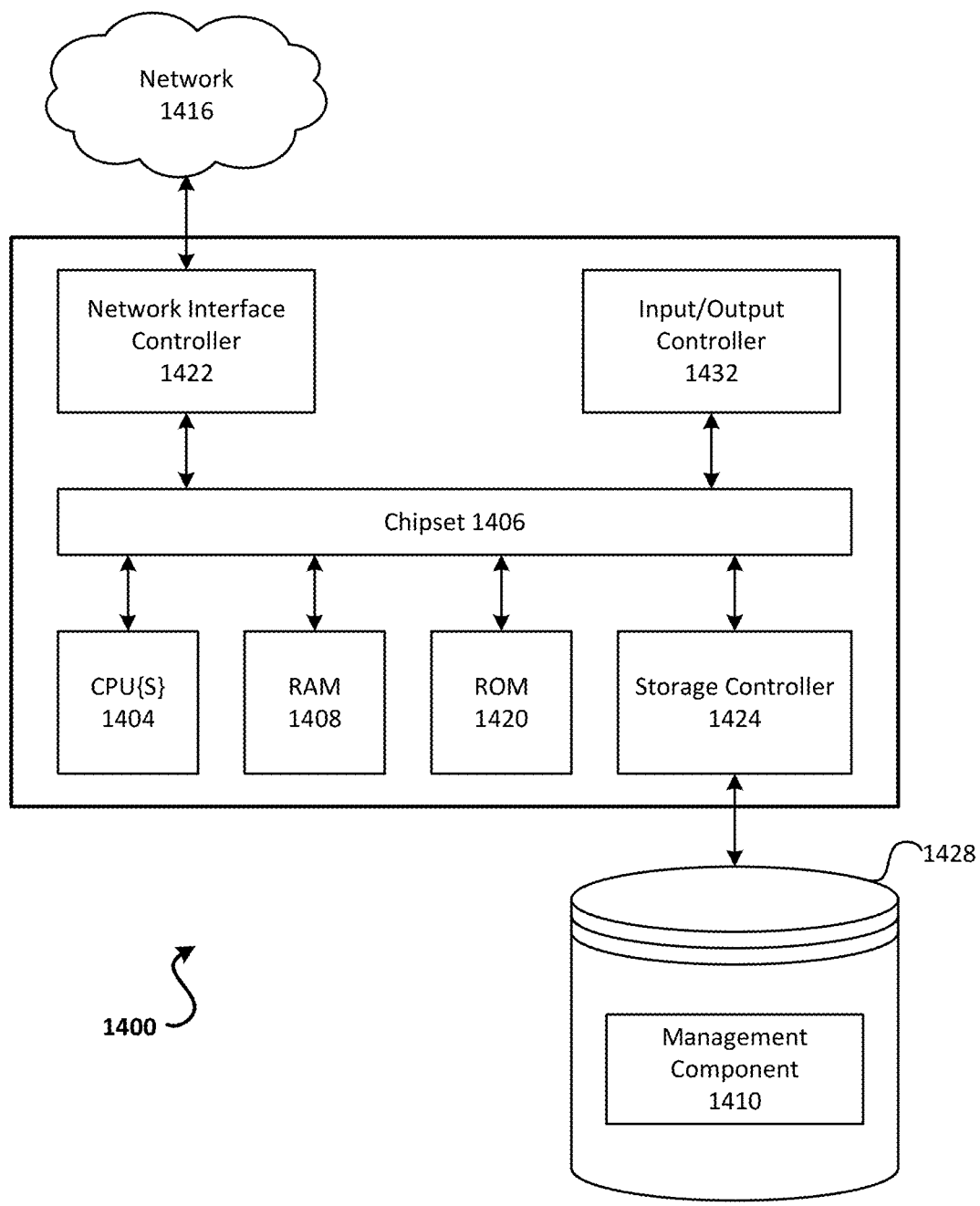
FIG. 14 shows an example computer system for implementing one or more aspects of the disclosure.

FIG. 14 depicts a computing device that may be used in various aspects, such as the servers, modules, and/or devices depicted in FIG. 1. With regards to the example architecture of FIG. 1, the data service 102, the request service 104, the user device 106, the capture element 108, and the display element 110 may each be implemented in an instance of a computing device 1400 of FIG. 14. The computer architecture shown in FIG. 14 shows a conventional server computer, workstation, desktop computer, laptop, tablet, network appliance, PDA, e-reader, digital cellular phone, or other computing node, and may be utilized to execute any aspects of the computers described herein, such as to implement any of the components illustrated in FIG. 1 and/or the methods described in relation to FIGS. 1-13.

The computing device 1400 may include a baseboard, or "motherboard," which is a printed circuit board to which a multitude of components or devices may be connected by way of a system bus or other electrical communication paths. One or more central processing units (CPUs) 1404 may operate in conjunction with a chipset 1406. The CPU(s) 1404 may be standard programmable processors that perform arithmetic and logical operations necessary for the operation of the computing device 1400.

The CPU(s) 1404 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1404 may be augmented with or replaced by other processing units, such as GPU(s) 1405. The GPU(s) 1405 may comprise processing units specialized for but not necessarily limited to highly parallel computations, such as graphics and other visualization-related processing.

A chipset 1406 may provide an interface between the CPU(s) 1404 and the remainder of the components and devices on the baseboard. The chipset 1406 may provide an interface to a random access memory (RAM) 1408 used as the main memory in the computing device 1400. The chipset 1406 may further provide an interface to a computer-readable storage medium, such as a read-only memory (ROM) 1420 or non-volatile RAM (NVRAM) (not shown), for storing basic routines that may help to start up the computing device 1400 and to transfer information between the various components and devices. ROM 1420 or NVRAM may also store other software components necessary for the operation of the computing device 1400 in accordance with the aspects described herein.

The computing device 1400 may operate in a networked environment using logical connections to remote computing nodes and computer systems through local area network (LAN) 1416. The chipset 1406 may include functionality for providing network connectivity through a network interface controller (NIC) 1422, such as a gigabit Ethernet adapter. A NIC 1422 may be capable of connecting the computing device 1400 to other computing nodes over a network 1416. It should be appreciated that multiple NICs 1422 may be present in the computing device 1400, connecting the computing device to other types of networks and remote computer systems.

The computing device 1400 may be connected to a mass storage device 1428 that provides non-volatile storage for the computer. The mass storage device 1428 may store system programs, application programs, other program modules, and data, which have been described in greater detail herein. The mass storage device 1428 may be connected to the computing device 1400 through a storage controller 1424 connected to the chipset 1406. The mass storage device 1428 may consist of one or more physical storage units. A storage controller 1424 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1400 may store data on a mass storage device 1428 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1428 is characterized as primary or secondary storage and the like.

For example, the computing device 1400 may store information to the mass storage device 1428 by issuing instructions through a storage controller 1424 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1400 may further read information from the mass storage device 1428 by detecting the physical states or characteristics of one or more particular locations within the physical storage units.

In addition to the mass storage device 1428 described above, the computing device 1400 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1400.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1428 depicted in FIG. 14, may store an operating system utilized to control the operation of the computing device 1400. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1428 may store other system or application programs and data utilized by the computing device 1400.

The mass storage device 1428 or other computer-readable storage media may also be encoded with computer-executable instructions, which, when loaded into the computing device 1400, transforms the computing device from a general-purpose computing system into a special-purpose computer capable of implementing the aspects described herein. These computer-executable instructions transform the computing device 1400 by specifying how the CPU(s) 1404 transition between states, as described above. The computing device 1400 may have access to computer-readable storage media storing computer-executable instructions, which, when executed by the computing device 1400, may perform the methods described in relation to FIGS. 1-13.

A computing device, such as the computing device 1400 depicted in FIG. 14, may also include an input/output controller 1432 for receiving and processing input from a number of input devices, such as a keyboard, a mouse, a touchpad, a touch screen, an electronic stylus, or other type of input device. Similarly, an input/output controller 1432 may provide output to a display, such as a computer monitor, a flat-panel display, a digital projector, a printer, a plotter, or other type of output device. It will be appreciated that the computing device 1400 may not include all of the components shown in FIG. 14, may include other components that are not explicitly shown in FIG. 14, or may utilize an architecture completely different than that shown in FIG. 14.

As described herein, a computing device may be a physical computing device, such as the computing device 1400 of FIG. 14. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example FIGS. be considered as exemplary only, with a true scope and spirit being indicated by the following claims.

What is claimed:

1. A method comprising:
   determining, based on one or more text parsing rules and by removing one or more conditional terms from a natural language text associated with a request, a base question;
   determining, based on the base question and at least one of a plurality of machine learning models associated with a data store, a base query comprising one or more query parameters;
   determining, based on the base query and data indicative of the one or more conditional terms, a query in a language associated with the data store; and
   sending, based on the request, the query.

2. The method of claim 1, further comprising determining one or more additional query parameters corresponding to the one or more conditional terms, wherein determining the query comprises combining the one or more additional query parameters with the one or more query parameters.

3. The method of claim 1, wherein one or more of the base question or the one or more conditional terms are determined based on the natural language text without applying machine learning to the natural language text.

4. The method of claim 1, wherein determining the base query comprises causing the base question to be input to the at least one of the plurality of machine learning models, receiving the one or more query parameters as output from the at least one of the plurality of machine learning models, and determining the query by combining the one or more query parameters.

5. The method of claim 1, wherein determining the base question comprises determining, by applying a heuristic search to the natural language text, the one or more conditional terms.

6. The method of claim 1, wherein the language comprises a structured query language for accessing the data store.

7. The method of claim 1, wherein the plurality of machine learning models are configured to determine, for the request, one or more of: columns of the data store, mathematical functions to apply to values of the data store, conditions to evaluate on the data store, columns to group results from the data store, ordering of results for values in a column of the data store, or a limit of a number or results from the data store.

8. A method comprising:
   receiving audio data associated with requesting data from a data store;
   determining, based on the audio data, data indicative of a natural language text;
   determining, based on a search of the data indicative of the natural language text, a base question and a first set of query parameters;
   determining, based on inputting the base question into a plurality of machine learning models, a second set of query parameters;
   determining, based on the first set of query parameters and the second set of query parameters, a query in a language associated with the data store; and
   causing, based on the query, the requested data to be retrieved from the data store.

9. The method of claim 8, wherein determining the first set of query parameters comprises determining, without using machine learning to identify query parameters, the first set of query parameters.

10. The method of claim 8, wherein each of the plurality of machine learning models is associated with determining one or more of a specific type of query clause, a specific function of a query clause, or a specific query parameter of a query clause.

11. The method of claim 8, wherein determining the base question and the first set of query parameters comprises applying, to the data indicative of the natural language text, one or more text parsing rules associating one or more words with corresponding types of query parameters.

12. The method of claim 8, wherein determining the query in the language associated with the data store comprises one or more of: adding the second set of query parameters to the first set of query parameters, or prioritizing the first set of query parameters in resolving conflicts between the first set of query parameters and the second set of query parameters.

13. The method of claim 8, wherein the base question comprises a remaining portion of the data indicative of the natural language text after removing words associated with the first set of query modifiers, and wherein determining the query comprises translating at least one of the base question, the first set of query parameters, or the second set of query parameters to the language associated with the data store.

14. The method of claim 8, further comprising determining, based on a filter model and the natural language text, whether a request indicated in the data indicative of the natural language text is outside or within a scope of the data store, wherein the filter model comprises a machine learning model trained based on a plurality of questions indicated as within the scope of the data store and a plurality of questions indicated as outside of the scope of the data store.

15. A method comprising:
    causing, based on values in a data store, training of a plurality of machine learning models to determine query information for the data store;
    determining, based on identifying conditional terms associated with data indicative of a request from a user, a base question and first data for generating a query for the data store;
    determining, based on the base question and the plurality of machine learning models, second data for generating the query; and
    causing, based on generating the query using the first data and the second data, the query to be sent to the data store.

16. The method of claim 15, wherein each of the plurality of machine learning models is associated with determining one or more of a specific type of query clause, a specific function of a query clause, or a specific query parameter of a query clause.

17. The method of claim 15, wherein determining the base question and the first data comprises determining, based on one or more text parsing rules associating one or more words with corresponding types of query parameters, the base question and the first data.

18. The method of claim 15, further comprising determining a training data set by adding data from the data store to one or more templates associating natural language text with corresponding queries in a language of the data store, wherein causing the training comprises causing, based on the training data set, the training.

19. The method of claim 15, wherein the plurality of machine learning models are configured to determine, for the request, one or more of: columns of the data store, mathematical functions to apply to values of the data store, conditions to evaluate on the data store, columns to group results from the data store, ordering of results for values in a column of the data store, or a limit of a number or results from the data store.

20. The method of claim 15, further comprising determining, based on a filter model and the data indicative of the request, whether the request is outside or within a scope of the data store, wherein the filter model comprises a machine learning model trained based on a plurality of questions indicated as within the scope of the data store and a plurality of questions indicated as outside of the scope of the data store.

* * * * *